(12) United States Patent
Li et al.

(10) Patent No.: US 12,079,971 B2
(45) Date of Patent: Sep. 3, 2024

(54) HAND MOTION PATTERN MODELING AND MOTION BLUR SYNTHESIZING TECHNIQUES

(71) Applicant: Samsung Electronics Co., Ltd., Suwon-si (KR)

(72) Inventors: Yingmao Li, Allen, TX (US); Hamid R. Sheikh, Allen, TX (US); John Seokjun Lee, Allen, TX (US); Youngmin Kim, SungNam (KR); Jun Ki Cho, Suwon (KR); Seung-Chul Jeon, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 17/666,166

(22) Filed: Feb. 7, 2022

(65) Prior Publication Data
US 2023/0252608 A1 Aug. 10, 2023

(51) Int. Cl.
*G06V 10/00* (2022.01)
*G06T 5/77* (2024.01)

(52) U.S. Cl.
CPC ...... *G06T 5/77* (2024.01); *G06T 2207/10144* (2013.01); *G06T 2207/20081* (2013.01); *G06T 2207/20084* (2013.01)

(58) Field of Classification Search
CPC ... G06T 5/77; G06T 5/60; G06N 3/02; G06N 3/08; G06N 3/045; G06N 3/092;
(Continued)

(56) References Cited

U.S. PATENT DOCUMENTS

| 5,430,480 A * | 7/1995 | Allen ............... H04N 23/68 348/208.4 |
| 8,520,094 B2 * | 8/2013 | Lee ............... H04N 23/70 348/226.1 |

(Continued)

FOREIGN PATENT DOCUMENTS

| CN | 111971686 A | 11/2020 |
| CN | 112102185 A | 12/2020 |

(Continued)

OTHER PUBLICATIONS

International Search Report and Written Opinion of the International Searching Authority dated May 11, 2023 in connection with International Patent Application No. PCT/KR2023/001739, 11 pages.

*Primary Examiner* — Amir Alavi

(57) ABSTRACT

A method includes obtaining, using a stationary sensor of an electronic device, multiple image frames including first and second image frames. The method also includes generating, using multiple previously generated motion vectors, a first motion-distorted image frame using the first image frame and a second motion-distorted image frame using the second image frame. The method further includes adding noise to the motion-distorted image frames to generate first and second noisy motion-distorted image frames. The method also includes performing (i) a first multi-frame processing (MFP) operation to generate a ground truth image using the motion-distorted image frames and (ii) a second MFP operation to generate an input image using the noisy motion-distorted image frames. In addition, the method includes storing the ground truth and input images as an image pair for training an artificial intelligence/machine learning (AI/ML)-based image processing operation for removing image distortions caused by handheld image capture.

22 Claims, 17 Drawing Sheets

(58) Field of Classification Search
CPC ...... G06N 3/0475; G06N 3/042; G06N 3/082; G06N 3/0454; G06N 3/0464; G06N 3/049; G06N 20/00; G06N 20/20; G06N 20/10

See application file for complete search history.

(56) References Cited

U.S. PATENT DOCUMENTS

| | | | |
|---|---|---|---|
| 9,020,189 B2* | 4/2015 | Lee | G06F 3/0304 |
| | | | 348/169 |
| 9,046,977 B2* | 6/2015 | Mahalingam | G06F 3/0446 |
| 9,863,767 B2* | 1/2018 | Fuchikami | G01B 11/026 |
| 10,430,647 B2* | 10/2019 | Price | G06V 10/141 |
| 10,944,914 B1 | 3/2021 | Le et al. | |
| 11,032,476 B2* | 6/2021 | Kim | G06T 5/73 |
| 11,102,418 B2* | 8/2021 | Shimokawa | H04N 23/71 |
| 11,222,409 B2 | 1/2022 | Tran et al. | |
| 11,388,348 B2 | 7/2022 | Le et al. | |
| 11,809,613 B2* | 11/2023 | Zahnert | G06F 3/012 |
| 11,875,012 B2* | 1/2024 | Benson | G06V 10/82 |
| 2014/0160056 A1* | 6/2014 | Mahalingam | G06F 3/0445 |
| | | | 345/174 |
| 2020/0151963 A1 | 5/2020 | Lee et al. | |
| 2020/0265567 A1 | 8/2020 | Hu et al. | |
| 2020/0329187 A1 | 10/2020 | Huang | |
| 2020/0372614 A1 | 11/2020 | Tran et al. | |
| 2020/0372622 A1 | 11/2020 | Wang et al. | |
| 2021/0174143 A1 | 6/2021 | Sato et al. | |
| 2023/0252608 A1* | 8/2023 | Li | G06T 5/60 |
| | | | 382/275 |

FOREIGN PATENT DOCUMENTS

| | | |
|---|---|---|
| CN | 112232282 A | 1/2021 |
| KR | 10-2021-0018084 A | 2/2021 |
| KR | 10-2021-0069006 A | 6/2021 |

* cited by examiner

Captured Image Frame From Stationary Camera

Motion-Distorted Image Frame

Motion-Distorted Image Frame

Captured Image Frame From Handheld Camera

Three axis rotations (degree) and translations (up to a scale)

HAND MOTION PATTERN MODELING AND MOTION BLUR SYNTHESIZING TECHNIQUES

TECHNICAL FIELD

This disclosure relates generally to image processing. More specifically, this disclosure relates to hand motion pattern modeling and motion blur synthesizing techniques.

BACKGROUND

Many mobile electronic devices, such as smartphones and tablet computers, include cameras that can be used to capture still and video images. Such devices have become prevalent for capturing, uploading, and sharing digital images. While convenient, cameras on mobile electronic devices typically suffer from a number of short comings. For example, users taking pictures with cameras on mobile electronic devices commonly hold the electronic devices by hand, and even the most careful user inevitably introduces small camera motions due to handshake. The amount of handshake is increased during long exposure scenarios that can occur in reduced light situations. When the amount of handshake is high, a significant amount of frame blur can be introduced into an image frame. Image blur degrades image quality for the end user.

SUMMARY

This disclosure relates to hand motion pattern modeling and motion blur synthesizing techniques.

In a first embodiment, a method for synthetic image training data generation includes obtaining, using at least one sensor of an electronic device that is stationary, multiple image frames of a scene including a first image frame and a second image frame. The method also includes generating, using multiple motion vectors that were previously generated, a first motion-distorted image frame using the first image frame and a second motion-distorted image frame using the second image frame. The method further includes adding noise to the first and second motion-distorted image frames to generate first and second noisy motion-distorted image frames. The method also includes performing (i) a first multi-frame processing (MFP) operation to generate a ground truth image using the first and second motion-distorted image frames and (ii) a second MFP operation to generate an input image using the first and second noisy motion-distorted image frames. In addition, the method includes storing the ground truth image and the input image as an image pair for training an artificial intelligence/machine learning (AI/ML)-based image processing operation for removing image distortions caused by handheld image capture.

In a second embodiment, an electronic device includes at least one sensor. The electronic device also includes at least one processing device configured to obtain, using the at least one sensor while the electronic device is stationary, multiple image frames of a scene including a first image frame and a second image frame. The at least one processing device is also configured to generate, using multiple motion vectors that were previously generated, a first motion-distorted image frame using the first image frame and a second motion-distorted image frame using the second image frame. The at least one processing device is further configured to add noise to the first and second motion-distorted image frames to generate first and second noisy motion-distorted image frames. The at least one processing device is also configured to perform (i) a first MFP operation to generate a ground truth image using the first and second motion-distorted image frames and (ii) a second MFP operation to generate an input image using the first and second noisy motion-distorted image frames. In addition, the at least one processing device is configured to store the ground truth image and the input image as an image pair for training an AI/ML-based image processing operation for removing image distortions caused by handheld image capture.

In a third embodiment, a method for image processing includes obtaining, using at least one sensor of an electronic device that is handheld, multiple image frames of a scene using multiple exposure times during a multi-frame capture operation. The method also includes performing an AI/ML-based image processing operation to remove one or more handheld motion distortions included in the multiple image frames in order to generate a blended image. The AI/ML-based image processing operation is trained using multiple image pairs, where each of the image pairs includes (i) a ground truth image with motion distortion and (ii) an input image corresponding to a noisy version of the ground truth image.

In a fourth embodiment, an electronic device includes at least one sensor. The electronic device also includes at least one processing device configured to obtain, using the at least one sensor while the electronic device is handheld, multiple image frames of a scene using multiple exposure times during a multi-frame capture operation. The at least one processing device is also configured to perform an AI/ML-based image processing operation to remove one or more handheld motion distortions included in the multiple image frames in order to generate a blended image. The AI/ML-based image processing operation is trained using multiple image pairs, where each of the image pairs includes (i) a ground truth image with motion distortion and (ii) an input image corresponding to a noisy version of the ground truth image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" in accordance with this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
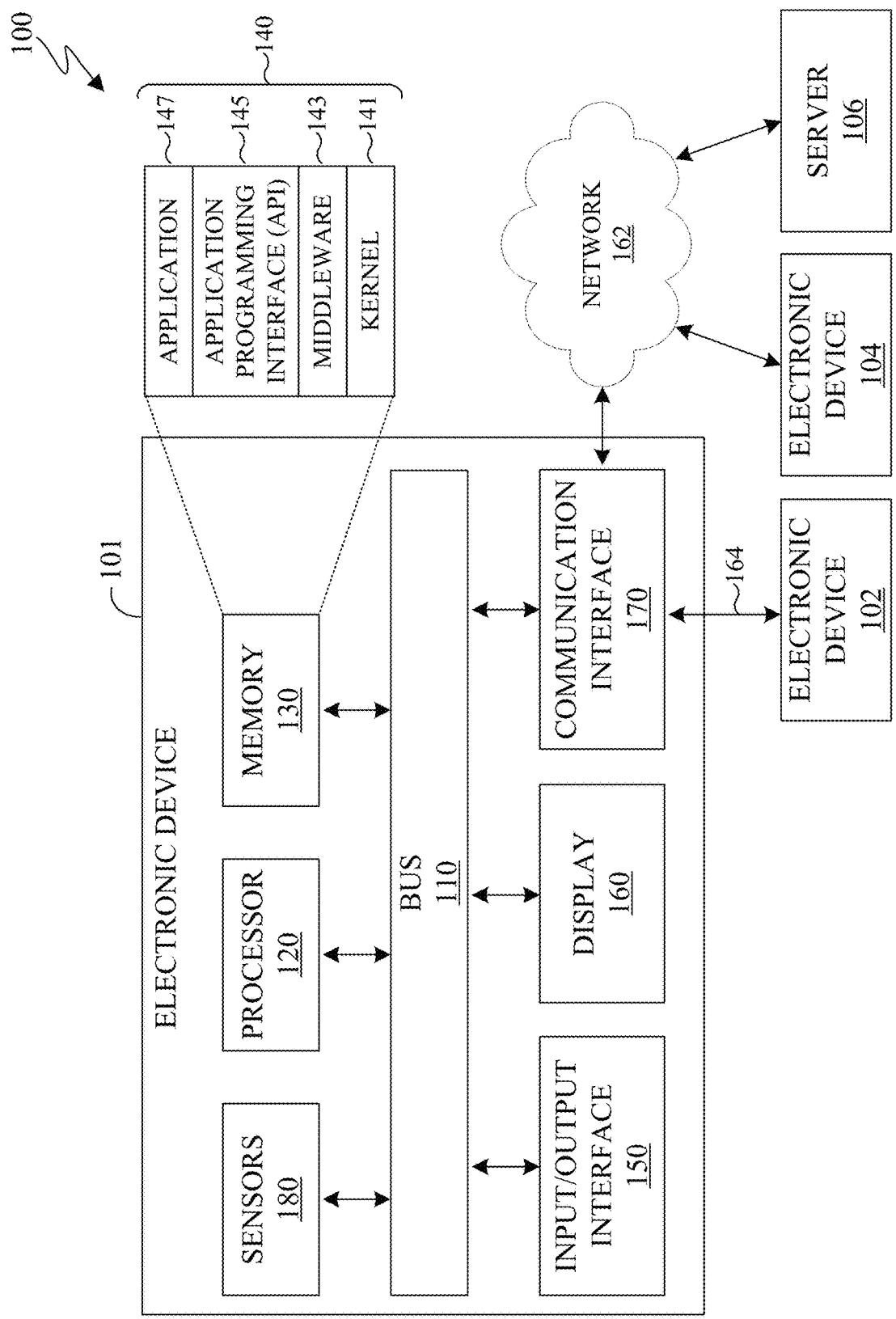
FIG. 1 illustrates an example network configuration including an electronic device in accordance with this disclosure.

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

As noted above, many mobile electronic devices, such as smartphones and tablet computers, include cameras that can be used to capture still and video images. Such devices have become prevalent for capturing, uploading, and sharing digital images. While convenient, cameras on mobile electronic devices typically suffer from a number of short comings. For example, users taking pictures with cameras on mobile electronic devices commonly hold the electronic devices by hand, and even the most careful user inevitably introduces small camera motions due to handshake. The amount of handshake is increased during long exposure scenarios that can occur in reduced light situations. When the amount of handshake is high, a significant amount of frame blur can be introduced into an image frame. Image blur degrades image quality for the end user.

A mobile electronic device can perform a number of image processing functions to capture images. Various image processing functions can include the use of artificial intelligence/machine learning (AI/ML) functions in order to provide higher image quality to users. For example, AI technology has been applied recently to various aspects of image processing, such as denoising, motion deblur, high dynamic range (HDR), segmentation, disparity estimate, and the like. As a particular example, an AI-based noise reduction operation can be implemented for removing noise from images. In order to train an AI-based noise reduction operation, multiple image pairs are often required, where one image in each pair is a noisy image and another image in each pair is a ground truth (clean) image. The noisy images and the ground truth images are used as inputs for training an AI network to remove image noise.

As another particular example, an AI-based multi-frame processing (MFP) operation enables an electronic device to capture and combine multiple image frames in order to produce higher-quality images. Image quality improvements, such as HDR, low-light photography, and motion blur reduction, are enabled based on MFP operations. In order to train an AI-based MFP operation, multiple image pairs are often required, where each pair includes an input image and a ground truth image. If the input image is a handheld image and the ground truth image is a stationary image, an AI network can be trained to remove blur due to handshake motion when combining the images together.

Unfortunately, creating realistic training data is challenging for some applications because ground truth data is not available or is not easy to generate. Some of the challenges of implementing an AI-based image processing operation to replace a non-AI-based image processing operation include how to prepare, collect, and generate training data. Manual data captured using mobile electronic devices can be used for generating AI training data. However, manual data capture typically requires a large amount of human resources and costs, manually-capture datasets need to be reviewed by data engineers and are often deleted due of low-quality or incorrect capture, and training data needs to be recaptured and reviewed again if camera sensor hardware changes.

As a particular example of this, an MFP operation includes a multi-frame capture operation and a blending operation, where the blending operation blends multiple image frames captured during the multi-frame capture operation. Since the capture operation captures multiple image frames over a period of time, small camera motions due to handshake can affect the alignment among the multiple image captures. When misalignment between image frames occurs, many of the captured image frames are not useful for training an AI-based MFP operation. Accordingly, each image frame often needs to be manually reviewed to determine its feasibility prior to being used as training data for an AI-based image processing operation.

Embodiments of the present disclosure describe various techniques to create training data to train an AI-based image processing operation. As described in more detail below, a synthetic multi-frame capture operation obtains multiple image frames captured using an electronic device. The multiple image frames are captured while the electronic device is stationary, such as when a tripod is used to capture the image frames during the multi-frame capture operation. For each image frame captured during the multi-frame capture operation, a motion-distorted image frame is generated. The generated motion-distorted image frames can be combined using an MFP operation to generate a ground truth image, which allows the ground truth image to contain known motion blur. Additionally, noise is added to each of the generated motion-distorted image frames to generate noisy motion-distorted image frames. The noisy motion-distorted image frames can be combined using another MFP operation to generate an input image. The ground truth image and the input image represent an input pair that can be used to train an AI-based image processing operation. Once trained, the AI-based image processing operation can be used to remove small camera motions due to handshake in an MFP operation.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

In accordance with this disclosure, an electronic device 101 is included in the network configuration 100. The electronic device 101 can include at least one of a bus 110, a processor 120, a memory 130, an input/output (I/O) interface 150, a display 160, a communication interface 170 and sensors 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera or other image sensor during a capture event. Among other things, the processor 120 can process image data (as discussed in more detail below) to generate training data used to train an AI/ML operation for reducing image distortions caused by handheld image capture. Additionally or alternatively, the processor 120 can process image data (as discussed in more detail below) using an AI/ML operation that is trained to reduce image distortions caused by handheld image capture. For example, the processor 120 can use a trained AI/ML model to reduce image distortions in captured image frames.

The memory 130 can include a volatile and/or non-volatile memory. For example, the memory 130 can store commands or data related to at least one other component of the electronic device 101. In accordance with this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for image capture, generation of training data for AI/ML operations, and/or image processing using a trained AI/ML model as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other image sensors for capturing images of scenes or frames of a video. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. For example, the server 106 can receive image data captured by at least one camera or other image sensor during a capture event. Among other things, the server 106 can process image data (as discussed in more detail below) to generate training data used to train an AI/ML operation for reducing image distortions caused by handheld image capture. Additionally or alternatively, the server 106 can process image data (as discussed in more detail below) using an AI/ML operation that is trained to reduce image distortions caused by handheld image capture. For example, the server 106 can use a trained AI/ML model to reduce image distortions in captured image frames.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
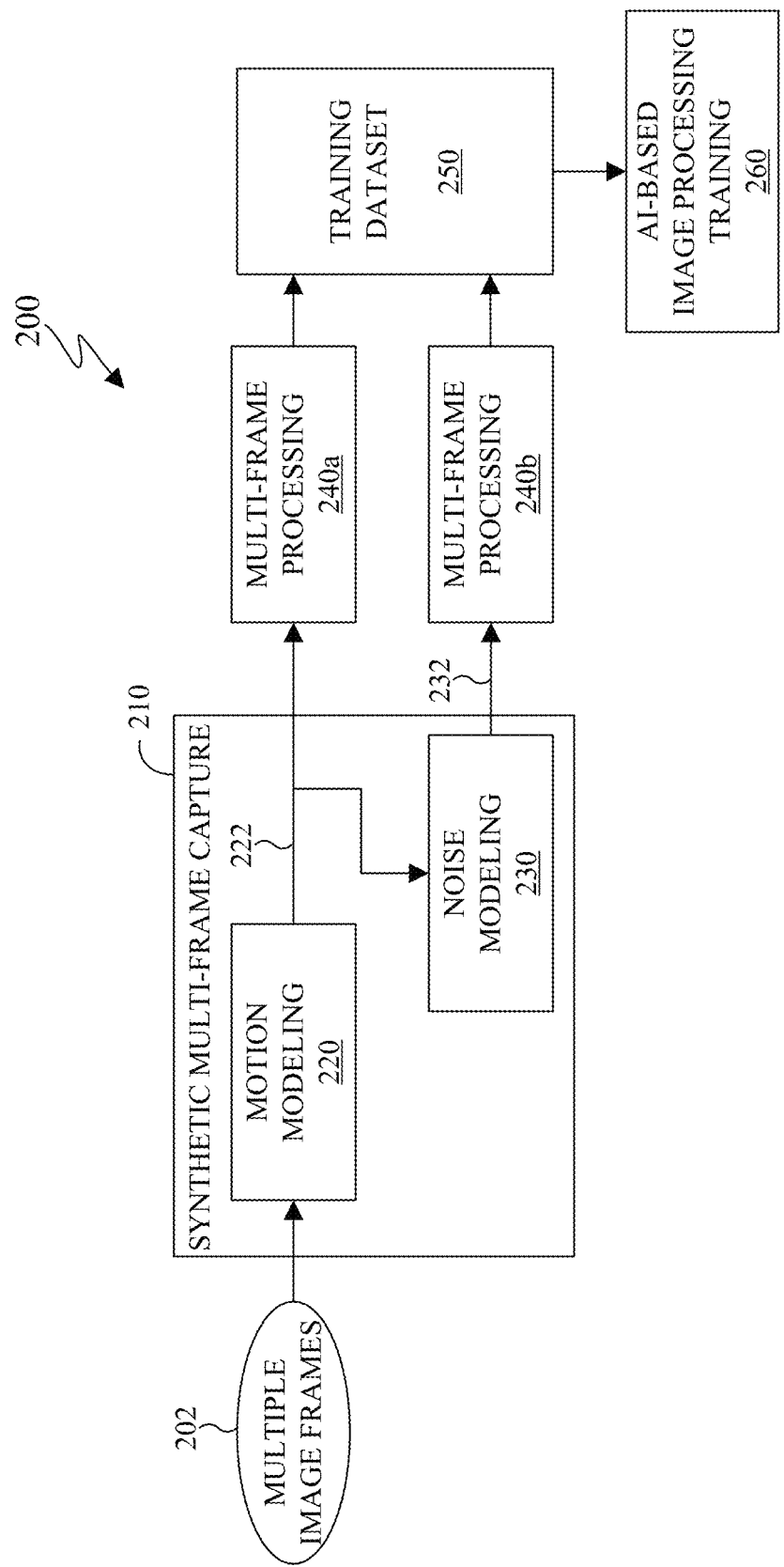
FIG. 2A illustrates an example process for generating training data for training an artificial intelligence/machine learning (AI/ML)-based image processing operation in accordance with this disclosure.
Figure 2B:
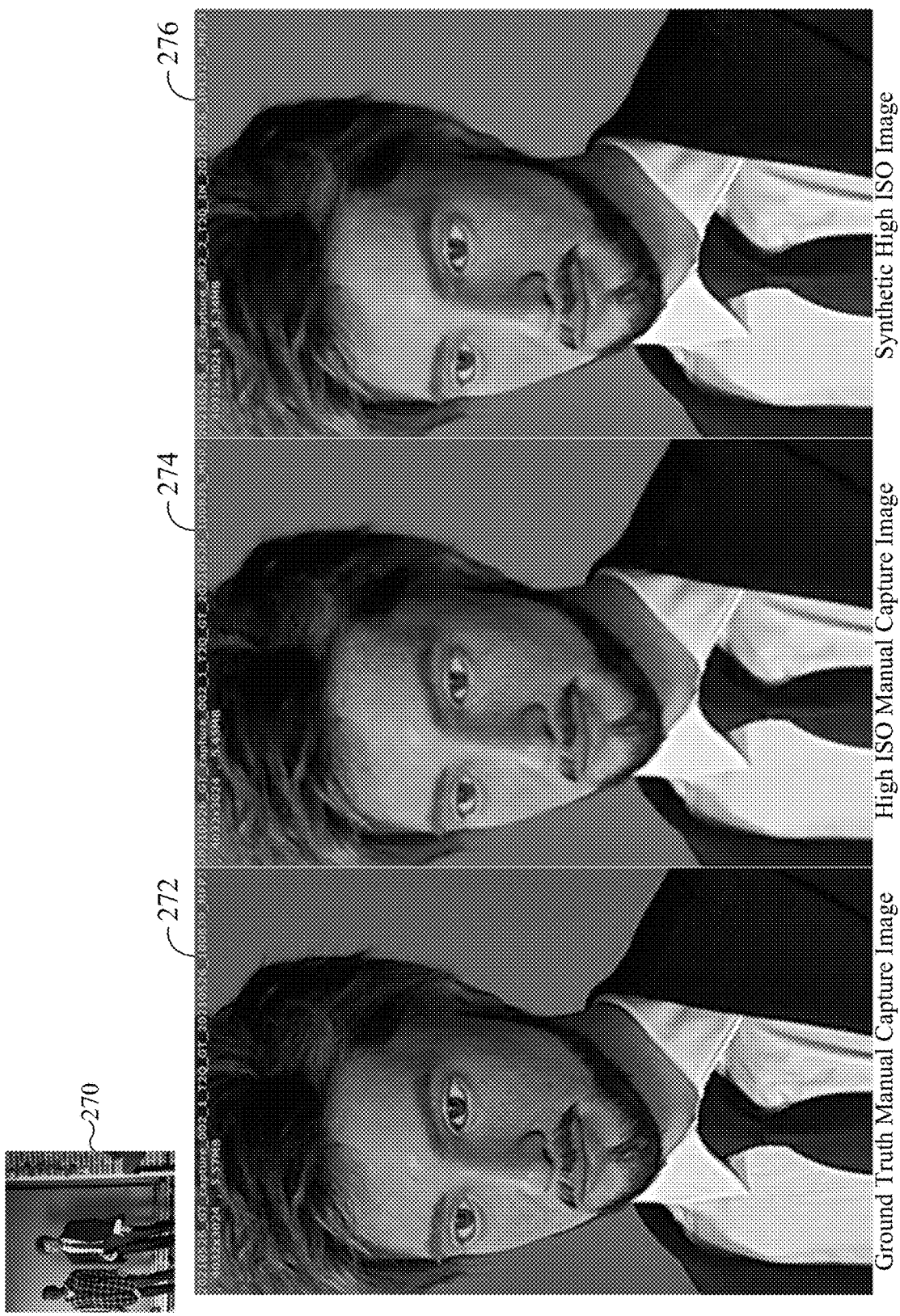
FIG. 2B illustrates example image frames in accordance with this disclosure.

FIG. 2A illustrates an example process 200 for generating training data for training an AI/ML-based image processing operation in accordance with this disclosure, and FIG. 2B illustrates example image frames in accordance with this disclosure. For ease of explanation, FIGS. 2A and 2B are described as being associated with the electronic device 101 shown in FIG. 1. However, FIGS. 2A and 2B could be associated with any other suitable electronic device and in any suitable system, such as when used by or with the server 106.

As shown in FIG. 2A, the process 200 is generally used to capture or otherwise obtain multiple image frames 202 of a scene and to process the image frames 202 in order to generate a training dataset 250 for an AI-based image processing training operation 260. Among other things, the training dataset 250 may include multiple image pairs of different scenes, different lighting conditions, different exposure settings, and the like. Additionally, some of the images included in the training dataset 250 may include additional noise based on particular image sensors, such as the sensor 180 of FIG. 1. Depending on the implementation, the process 200 may receive one image frame 202 or multiple image frames 202. The image frames 202 may be obtained in any suitable manner. For example, the image frames 202 can be captured by at least one camera or image sensor, such as the sensor 180 in FIG. 1. As another example, the image frames 202 can be obtained from an information repository, such as the memory 130 of FIG. 1.

In some embodiments, the image frames 202 may be captured using a tripod or other mechanism to safeguard against motion, such as motion caused by handshake. Additionally, the image frames 202 may be captured using the same exposure setting or different exposure settings, such as different ISO settings, different exposure times, or both different ISO settings and different exposure times. For example, the image frames 202 can be captured using the same ISO value but different exposure times. As another example, the image frames 202 can be captured using different ISO values and different exposure times. In some embodiments, the image frames 202 may be captured using longer exposure times for noise reduction. Longer exposure times can be possible when image frames are captured using a mechanism to safeguard against motion, such as a tripod. Using longer exposure times can also reduce the amount of noise within the image frame. In some instances, during a multi-frame capture operation, the processor 120 can control one or more cameras or other image sensors (such as the sensor 180 in FIG. 1) so that the image frames 202 are captured rapidly, such as in a burst mode. In other instances, if the electronic device 101 includes multiple cameras or other image sensors (such as multiple sensors 180 in FIG. 1), the image frames 202 may be captured simultaneously or in an overlapping manner.

A capture request that triggers the capture of the image frames 202 represents any suitable command or input indicating a need or desire to capture at least one image frame of a scene using the electronic device 101. For example, the capture request could be initiated in response to a user's pressing of a "soft" button presented on the display 160 or the user's pressing of a "hard" button. The multi-frame capture operation can capture one or more image frames for each capture request. For example, the multi-frame capture operation can capture five to ten image frames for a single capture request, where each of the captured image frames can be based on differing exposure settings.

In some embodiments, the multiple image frames 202 can include different sets of image frames. Each image frame set may share the same scene, aperture, and lens while exposure settings (such as ISO values and exposure times) between image frames of a particular set can vary. Additionally, different sets of image frames can be captured by a multi-frame capture operation and correspond to different scenes, different lighting conditions, different exposure settings, and the like. In this way, each of the image pairs that are generated and included in the training dataset 250 may correspond to a single lens based on image frames captured during a single multi-frame capture operation, but different image pairs may relate to different scenes and conditions.

The image frames 202 are provided to a synthetic multi-frame capture operation 210, which generally operates to generate a motion-distorted image frame 222 and a noisy motion-distorted image frame 232 for each image frame 202. In this example, the synthetic multi-frame capture operation 210 includes a motion modeling operation 220 and a noise modeling operation 230. The motion modeling operation 220 generates a motion-distorted image frame 222 for each image frame 202, and the noise modeling operation 230 adds noise to each generated motion-distorted image frame 222 to generate a noisy motion-distorted image frame 232.

In this example, for each image frame of the image frames 202, the synthetic multi-frame capture operation 210 generates two image frames. For example, if the multiple image frames 202 includes two image frames (with different exposure settings) denoted as a first image frame and a second image frame, the synthetic multi-frame capture operation 210 generates a first motion-distorted image frame (using the motion modeling operation 220) and a first noisy motion-distorted image frame (using the noise modeling operation 230) based on the first image frame with a first exposure setting. Additionally, the synthetic multi-frame capture operation 210 generates a second motion-distorted image frame (using the motion modeling operation 220) and a second noisy motion-distorted image frame (using the noise modeling operation 230) based on the second image frame with a second exposure setting.

Figure 3A:
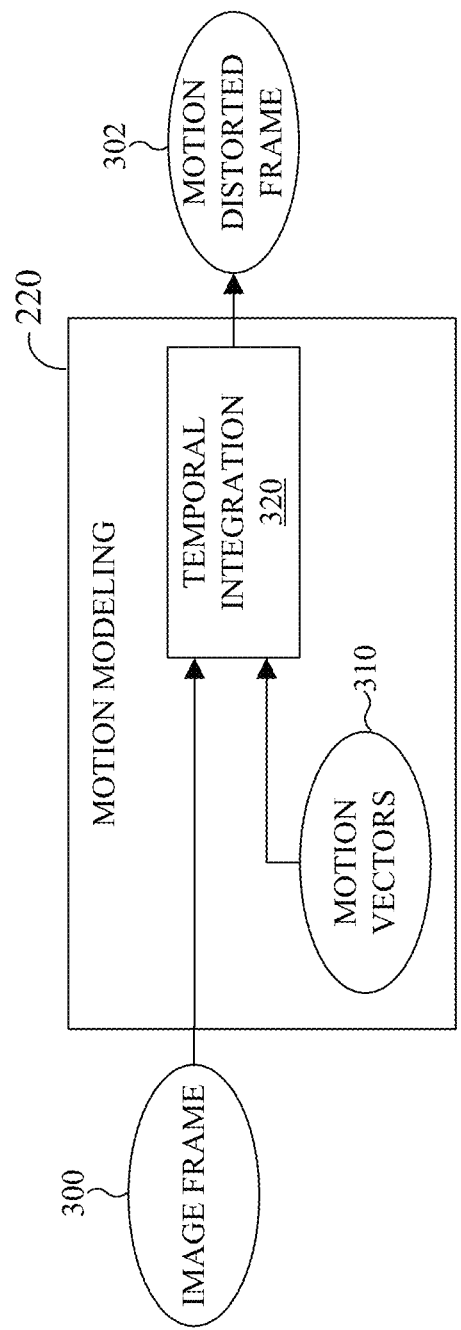
FIG. 3A illustrates an example generation of motion-distorted image frames in the process of FIG. 2A in accordance with this disclosure.
Figure 3B:
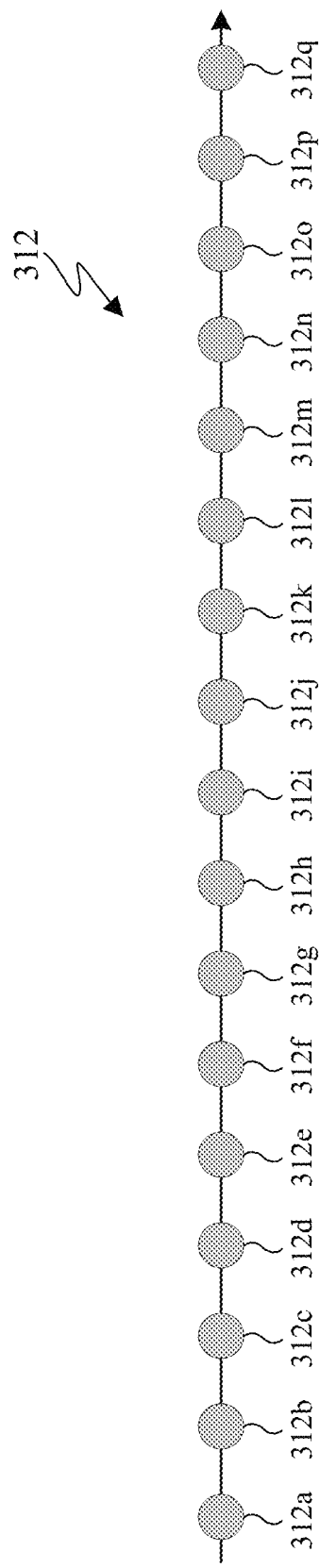
FIG. 3B illustrates an example selection of motion vectors in accordance with this disclosure.
Figure 3C:
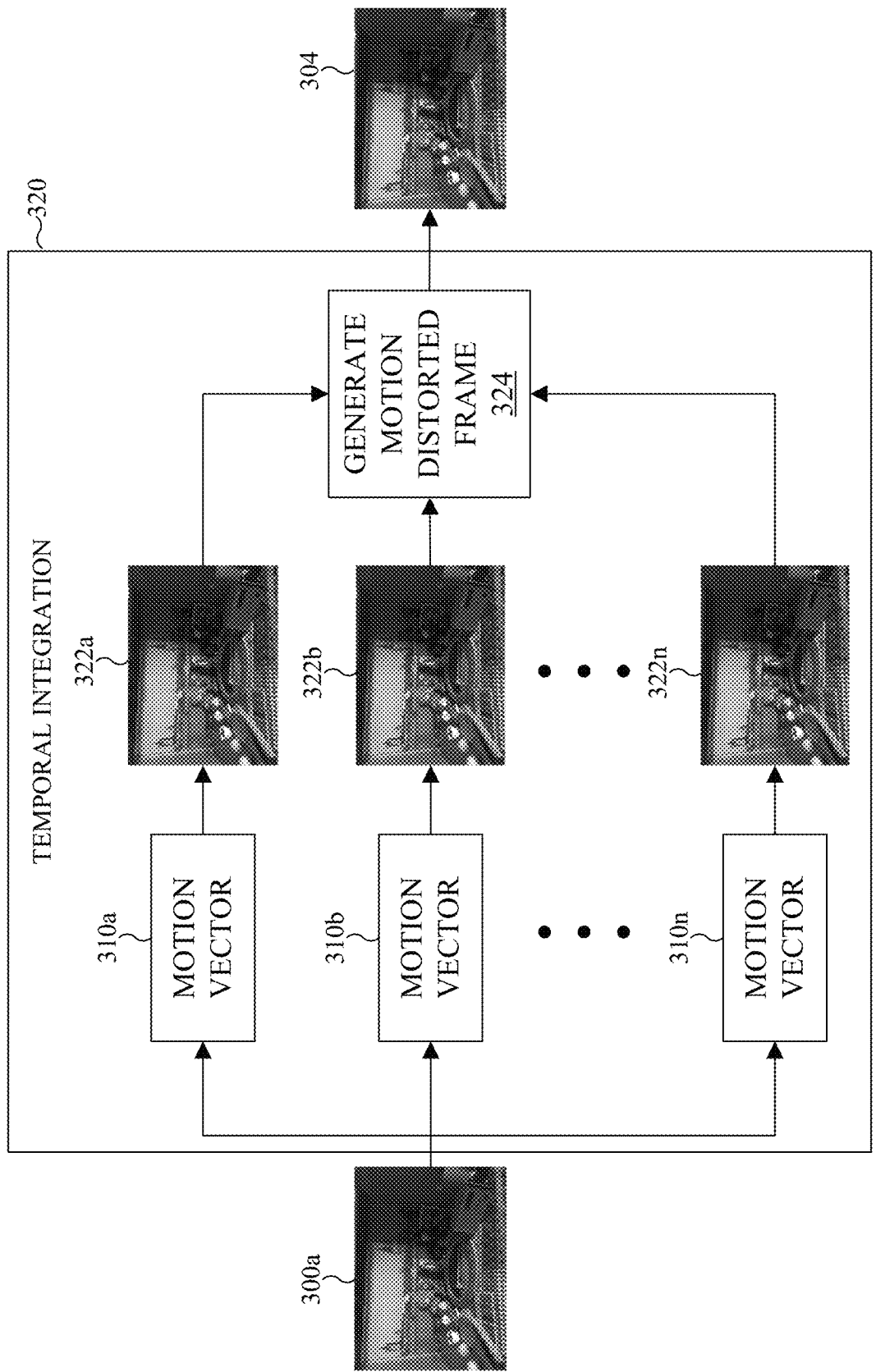
FIG. 3C illustrates an example process for generating motion-distorted image frames in the process of FIG. 2A in accordance with this disclosure.

In some embodiment, the motion modeling operation 220 distorts each of the image frames 202 based on its exposure setting. For example, the amount of distortion that is added to generate each motion-distorted image frame 222 may be based on an exposure time of a specific one of the image frames 202. The motion modeling operation 220 may also apply a number of previously-generated motion vectors to distort an image frame 202 and generate a motion-distorted image frame 222. The number of motion vectors that are used with an image frame 202 can be based on an exposure time of the image frame 202. For instance, longer exposure times may be associated with the application of more motion vectors to the image frame 202. FIGS. 3A and 3C, discussed below, describe an example process for generating motion-distorted image frames 222. FIGS. 4A-4D, also discussed below, describe an example generation of motion vectors.

In some embodiments, the noise modeling operation 230 adds an amount of noise to an image frame based on an exposure setting of the image frame 202. For example, the noise modeling operation 230 may add an amount of noise to a specific image frame based on the ISO value used to capture that specific image frame. As a particular example, when an image frame 202 is captured using a low ISO value, the noise modeling operation 230 may add a small amount of noise. When an image frame 202 is captured using a high ISO value, the noise modeling operation 230 may add a large amount of noise. Since the noise modeling operation 230 can add noise to motion-distorted image frames 222, the ISO values used to capture the image frames (prior to undergoing motion distortion by the motion modeling operation 220) can be provided to the noise modeling operation 230.

Additionally, the process of adding noise may be based on one or more parameters of a particular image sensor (such as the sensor 180) for which the AI-based image processor operation is being trained for, since each sensor may produce slightly different levels of noise. In some cases, the noise parameters may include read noise, photon noise, and spatial correlations. Read noise is generated based on an operation of reading information from a sensor array while an image is being captured. Photon noise is a function of pixel brightness, meaning noise characteristics of a pixel can change as the pixel brightness changes. Spatial correlation is a function of the energy between pixels. The read noise, photon noise, and spatial correlation can be calibrated for a particular sensor. Thus, the noise modeling operation 230 can add an amount of noise based on one or more aspects of the sensor that captured the image frames. In some cases, the amount of added noise can be defined as follows:

$$I_n = \text{corr}[I + (N_p + N_r)] \quad (1)$$

Here, $I_n$ is a generated noisy motion-distorted image frame 232, and I is a motion-distorted image frame 222. Also, corr is a spatial correlation function, $N_p$ is the photon noise, and $N_r$ is the read noise. In some cases, the read noise $N_r$ can be defined as follows:

$$N_r = (I + \omega C(x_o, \gamma) + (1-\omega))G(m, \sigma)) \quad (2)$$

In FIG. 2B, an image frame 270 may represent one of the image frames 202 captured using a longer exposure and a tripod or other mechanism to safeguard against motion. An image frame 272 illustrates a zoomed-in version of the image frame 270 showing the image details. An image frame 274 is a different image frame that is manually captured using a handheld electronic device. The image frame 274 is blurry due to the electronic device being handheld and is noisy due to a high ISO value (compared to the image frame 272). An image frame 276 represents an image frame generated by the synthetic multi-frame capture operation 210. For example, the image frame 276 may represent an example of a noisy motion-distorted image frame 232. The image frame 276 is blurry and noisy as it represents the image frame 272 after being modified by the synthetic multi-frame capture operation 210. The similarity between the image frame 274 and the image frame 276 provides an indication that the synthetic multi-frame capture operation 210 can be used to successfully simulate image capture using a handheld electronic device, and this can be achieved without the need for manually capturing multiple image frames in order to train an AI-based image processing operation.

Returning to FIG. 2A, the motion-distorted image frames 222 are provided to an MFP operation 240a, which generally operates to align and blend or otherwise combine pixels from the multiple motion-distorted image frames 222 in order to produce a blended image of the scene. Similarly, the noisy motion-distorted image frames 232 are provided to an MFP operation 240b, which generally operates to align and blend or otherwise combine pixels from the multiple noisy motion-distorted image frames 232 in order to produce a blended image of the scene. Each of the MFP operations 240a and 240b can therefore receive multiple image frames and generate a single blended image. The images generated by the MFP operation 240a are ground truth images, and the images generated by the MFP operation 240b are input images. The generated ground truth images and input images represent image pairs. The MFP operations 240a-240b may use any suitable technique, now known or later developed, to blend multiple image frames. The ground truth images and the input images are provided as image pairs in the training dataset 250, which may be stored in a suitable memory or other storage location(s). The image pairs here can correspond to different scenes, different light conditions, and the like.

The image pairs that are included in the training dataset 250 can be provided to the AI-based image processing training operation 260, which generally operates to train a particular AI/ML-based image processing operation. For example, the AI-based image processing training operation 260 may be used to train one or more neural networks, convolution neural networks (CNNs), or other machine learning models. The AI/ML-based image processing operation is trained here to remove image distortions caused by handheld image capture for image frames captured by a particular sensor. For example, after the AI/ML-based image processing operation is trained, another electronic device can capture one or more image frames, and the trained AI/ML-based image processing operation can be used to reduce blur resulting from handshaking motion.

Although FIG. 2A illustrates one example of a process 200 for generating training data for training an AI/ML-based image processing operation and FIG. 2B illustrates example image frames that may be associated with the process 200, various changes may be made to FIGS. 2A and 2B. For example, the electronic device 101 may perform any additional desired functions as part of the process 200 or as part of a larger image processing algorithm. As a particular example, image frames may undergo other suitable pre-processing and post-processing operations. Also, the contents of the image frames shown in FIG. 2B are for illustration only and can easily vary based on the scene being imaged.

Figure 3D:
FIGS. 3D and 3E illustrate examples of captured image frames and generated motion-distorted image frames in accordance with this disclosure.
Figure 3D:
Figure 3E:
Figure 3E:

FIG. 3A illustrates an example generation of motion-distorted image frames in the process 200 of FIG. 2A in accordance with this disclosure. FIG. 3B illustrates an example selection of motion vectors in accordance with this disclosure. FIG. 3C illustrates an example process for generating motion-distorted image frames 222 in the process 200 of FIG. 2A in accordance with this disclosure. Here, the processes shown in FIGS. 3A and 3C may be performed as part or all of the motion modeling operation 220 in the process 200 shown in FIG. 2A. FIGS. 3D and 3E illustrate examples of captured image frames and generated motion-distorted image frames in accordance with this disclosure. For ease of explanation, FIGS. 3A through 3E are described as being associated with the electronic device 101 shown in FIG. 1. However, FIGS. 3A through 3E could be associated with any other suitable electronic device and in any suitable system, such as when used by or with the server 106.

As shown in FIG. 3A, the motion modeling operation 220 is generally used to adaptively distort an image frame 300 for generating a motion-distorted image frame 302 using a temporal integration operation 320. The motion modeling operation 220 of FIG. 3A may be the same as or similar to the motion modeling operation 220 of FIG. 2A. The image frame 300 can be one of the image frames 202 of FIG. 2A, and the motion-distorted image frame 302 can be one of the motion-distorted image frames 222 of FIG. 2A. Here, a single motion-distorted image frame 302 can be generated by the motion modeling operation 220 for a single image frame, such as the image frame 202 of FIG. 2A. Among other things, the motion modeling operation 220 can also generate motion vectors 310 for distorting the image frame 300. In some embodiments, the motion modeling operation 220 generates the motion vectors using other image frames. The generation of motion vectors are described below with respect to FIGS. 4A-4D.

In this example, one image frame 300 is captured and processed, although more than one image frame 300 may also be used. The image frame 300 may be obtained in any suitable manner. For example, the image frame 300 can be captured by at least one camera or image sensor, such as the sensor 180 in FIG. 1. As another example, the image frame 300 can be obtained from an information repository, such as the memory 130 of FIG. 1. The image frame 300 represents an image frame that is captured using a tripod or other mechanism to safeguard against motion. The image frame 300 can be based on a long exposure time.

The motion modeling operation 220 obtains the image frame 300 and identifies one or more exposure settings associated with the image frame 300. The one or more exposure settings may include exposure time, ISO value, or other exposure setting(s). Based on the one or more exposure settings, the motion modeling operation 220 can select a number of motion vectors 310. The motion vectors 310, as discussed below, can be generated by the motion modeling operation 220 or another operation using a different set of image frames, such as image frames that are captured at a high frame rate. A single motion vector 310 represents an amount of motion that is identified between each image frame of a set of image frames. In some embodiments, the different set of image frames can be captured at a high frame rate, such as 240 frames per second (FPS) or higher. The number of motion vectors 310 used to distort the image frame 300 can be based on a relationship between the one or more exposure settings (such as the exposure time) of the image frame 300 and a frame rate for the different set of image frames. In some cases, this relationship can be defined as follows:

$$r = \frac{1}{N} \quad (3)$$

$$n = \frac{f}{r} \quad (4)$$

Here, r is the time resolution of the different set of image frames that are captured at a frame rate N. The frame rate N is the number of image frames that are captured over a particular time interval, such as one second. The number n of motion vectors 310 that are used to distort the image frame 300 can be based on a ratio of the identified exposure time f of the image frame 300 to the time resolution r of the different set of image frames. For example, if the different set of image frames are captured at 100 FPS, the time resolution r between two of the image frames is 10 milliseconds. If the image frame 300 has an exposure time f of one second and the different set of image frames are captured at 100 FPS, the motion modeling operation 220 can selects 100 motion vectors (meaning n=100).

Since the motion vectors represent motion between two image frames of a different set of image frames, the motion modeling operation 220 can randomly select an initial motion vector representing the motion between two image frames. The motion modeling operation 220 may also select a number of subsequent motion vectors, representing motion between subsequent image frames of the different set of image frames, until a determined number of motion vectors (as specified in Equation (2)) are selected. In some embodiments, the motion modeling operation 220 selects a number of subsequent motion vectors for a set of image frames, such as the multiple image frames 202 of FIG. 2A. For example, the motion modeling operation 220 may select motion vectors one through n for a first image frame and select motion vectors n+1 through m for a second image frame (when the first and second image frames are captured during a multi-frame capture operation). When another image frame or set of image frames are obtained, the motion modeling operation 220 may randomly select another motion vector.

FIG. 3B illustrates an example diagram 312 for selecting motion vectors, such as motion vectors 312a-312q. The motion vectors 312a-312q can be the same as or similar to the motion vectors 310 of FIG. 3A. Each motion vector 312a-312q represents global motion between two image frames of the different set of image frames. The global motion includes both rotation motion and translation motion. Since the motion vectors 312a-312q represent motion between two image frames of the different set of image frames, the motion vectors 312a-312q follow a chronological order. The motion modeling operation 220 may randomly select a first motion vector. For example, if the motion modeling operation 220 determines that four motion vectors are needed to distort the image frame 300 (based on the frame rate of the different set of image frames and the exposure time of the image frame 300), the motion modeling operation 220 may select a random motion vector, such as the motion vector 312e. Thereafter, the motion modeling operation 220 selects the next three motion vectors 312f-312h. As such, the image frame 300 is distorted using the motion vectors 312e-312h. If the image frame 300 is part of a multi-frame capture, the motion modeling operation 220 may select the motion vector 312i and zero or more subsequent motion vectors (based on the frame rate of the different set of image frames and the exposure time of the subsequent image frame) for the next image frame in the sequence. The motion modeling operation 220 continues selecting consecutive motion vectors until all image frames of the multi-frame capture are distorted. When another set of image frames (or a set of frames from a multi-frame capture operation) is provided to the motion modeling operation 220, the motion modeling operation 220 can randomly select another motion vector and zero or more subsequent motion vectors based on the frame rate of that set of image frames and the exposure time of the subsequent image frame.

The temporal integration operation 320 of FIG. 3A simulates the exposure process of a sensor and creates a warped image frame of the image frame 300 based on each of the motion vectors 310. For example, the temporal integration operation 320 may distort the image frame 300 using one or more of the motion vector 310. Thereafter, the temporal integration operation 320 generates the motion-distorted image frame 302 by combining the multiple warped image frames. As shown in FIG. 3C, the temporal integration operation 320 may obtain an image frame 300a and generate a motion-distorted image frame 304. The image frame 300a can be the same as or similar to the image frame 300 of FIG. 3A. An image frame 330 of FIG. 3D illustrates one specific example of an image frame 300a. Similarly, the motion-distorted image frame 304 can be the same as or similar to the motion-distorted image frame 302 of FIG. 3A. An image frame 340 of FIG. 3D illustrates one specific example of the motion-distorted image frame 304. In this example, the temporal integration operation 320 includes a generate motion-distorted image operation 324.

The temporal integration operation 320 obtains a number of motion vectors 310a-310n, which can be similar to the motion vectors 310 of FIG. 3A or the motion vectors 312a-312q of FIG. 3B. The temporal integration operation 320 warps the image frame 300a, denoted as I, using the n selected motion vectors 310 to create n warped image frames $I_t$ (where t=1, 2, . . . , n). For each motion vector, the temporal integration operation 320 generates a warped image frame. As illustrated, the temporal integration operation 320 uses the motion vector 310a to generate the warped image frame 322a, and the temporal integration operation 320 uses the motion vector 310b to generate the warped image frame 322b.

The generate motion-distorted image operation 324 combines multiple warped image frames 322a-322n to generate the motion-distorted image frame 304. In some embodiments, the generate motion-distorted image operation 324 combines the multiple warped image frames 322a-322n by integrating and averaging the multiple warped image frames 322a-322n, which may be expressed as follows:

$$I_f = \frac{1}{n}\sum_{t=1}^{n} I_t \quad (5)$$

Here, $I_f$ is a motion-distorted image frame, such as the motion-distorted image frame 304 of FIG. 3C. Also, n is the number of warped image frames, and $I_t$ represents the warped image frames.

An example of a motion-distorted image frame and a blurry image frame caused by handshake motion are shown in FIG. 3E. FIG. 3E illustrates an image frame 350 that is generated using the motion modeling operation 220 of FIGS. 2A and 3A. The image frame 350 was originally captured when an electronic device was stationary, such as when a tripod or other mechanism to safeguard against handshake motion is used. The image frame 350 is blurry due to the synthetically-generated blurriness created by the motion modeling operation 220. An image frame 360 of FIG. 3E illustrates an example image frame that was captured when an electronic device was handheld. The image frame 360 is also blurry due to actual motion caused by handshake. The image frame 350 and the image frame 360 are captured using the same exposure settings. If the image frames 350 and 360 were captured using a multi-frame capture operation, the image frame 350 would be aligned with any previous and subsequent frames since the original image frame was captured using a tripod or other mechanism to safeguard against motion and blurriness was added to the original image frame. In contrast, the image frame 360 may not be aligned with any previous and subsequent frames since the blurriness was caused by hand motion. As such, using the image frame 350 for training an AI-based image processing operation to remove handshake from an image reduces the processing power needed since the images are already aligned.

Although FIGS. 3A through 3E illustrate one example of a process for generating a motion-distorted image frame and related details, various changes may be made to FIGS. 3A through 3E. For example, the electronic device 101 may perform any additional desired functions as part of the motion modeling operation 220 or as part of a larger image processing algorithm. As a particular example, image frames may undergo other suitable pre-processing and post-processing operations.

Figure 4A:
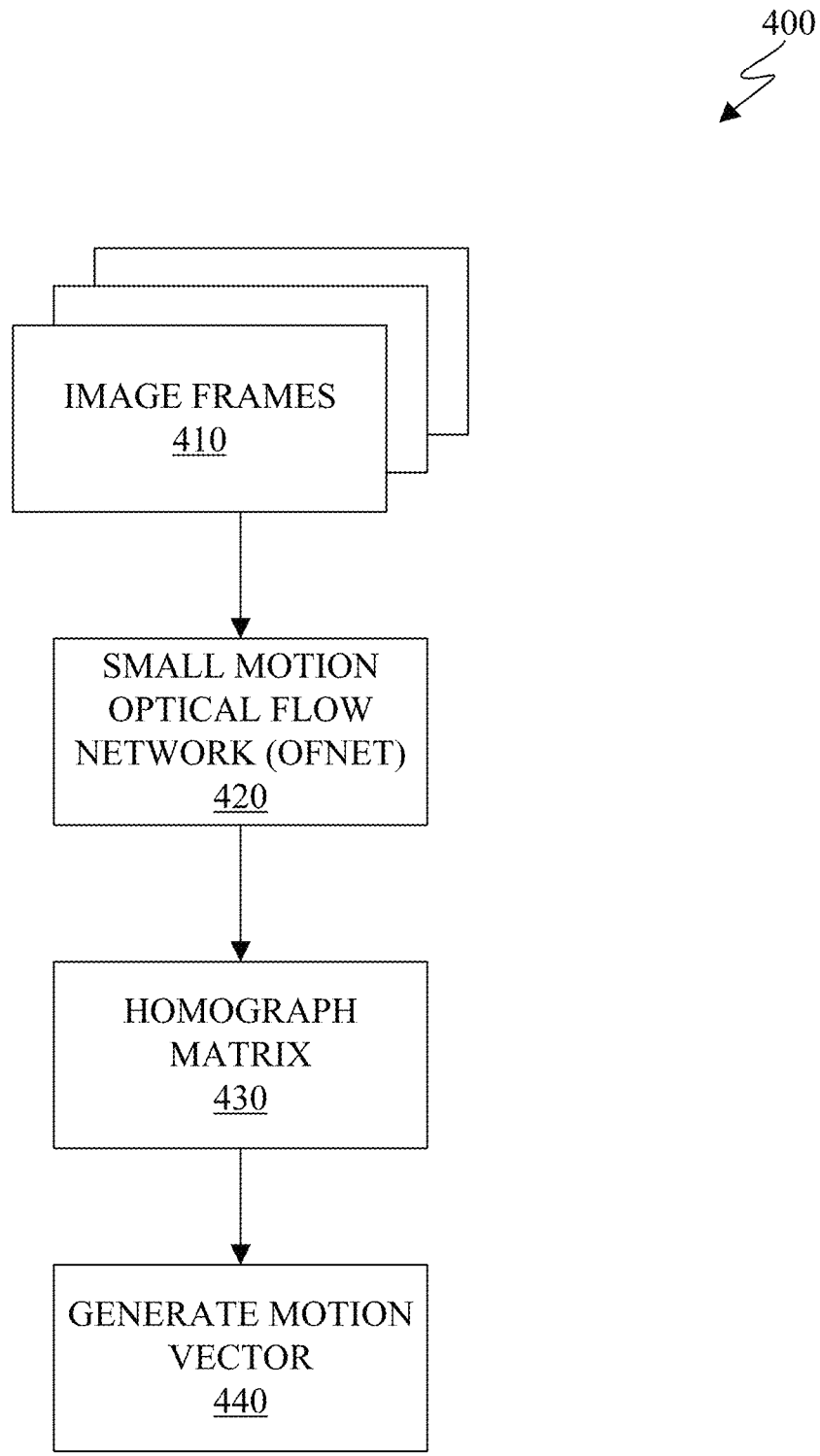
FIG. 4A illustrates an example process for generating motion vectors used to generate motion-distorted image frames in accordance with this disclosure.
Figure 4B:
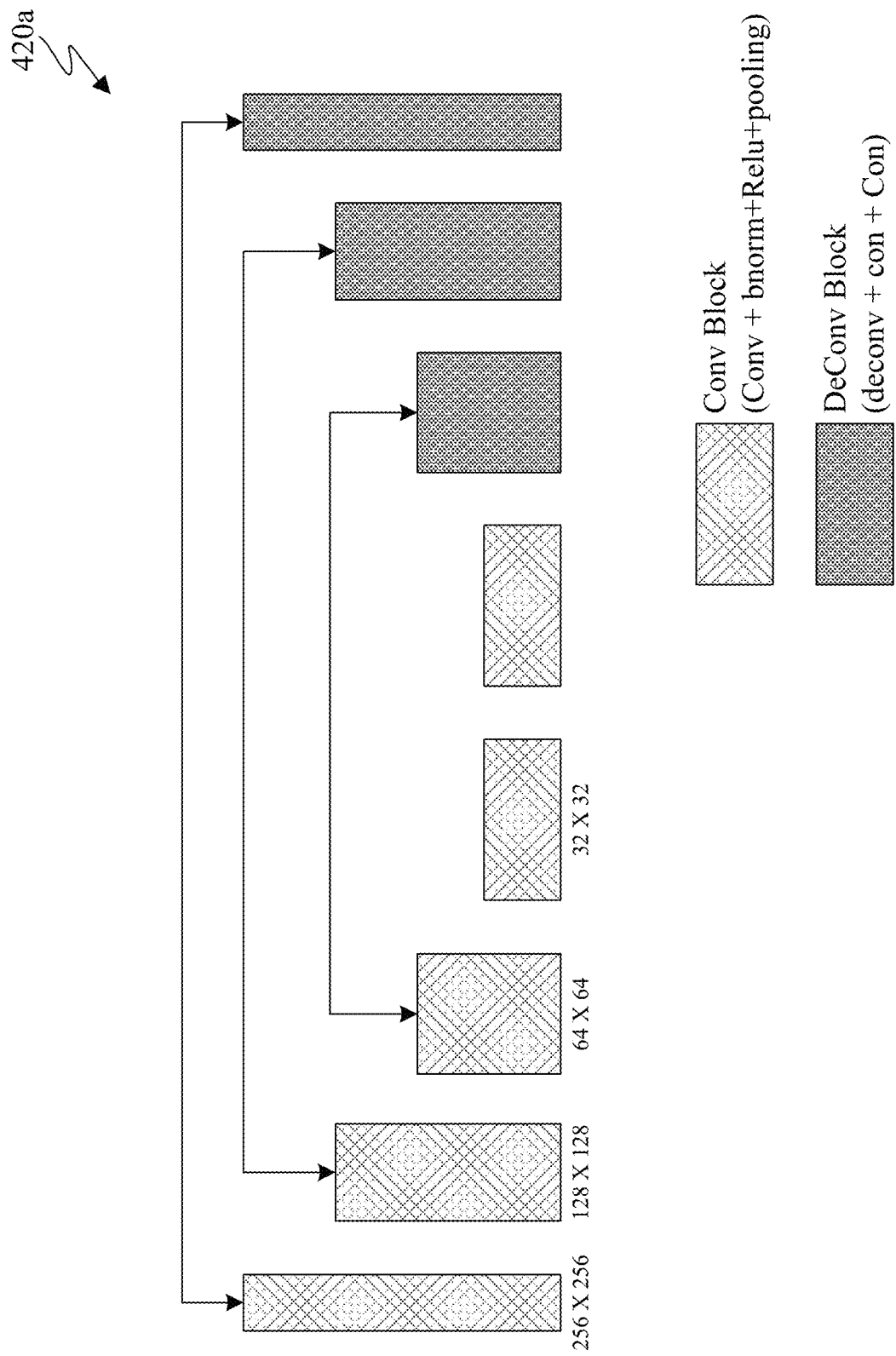
FIG. 4B illustrates an example neural network architecture used to identify motion for generating the motion vectors of FIG. 4A in accordance with this disclosure.
Figure 4C:
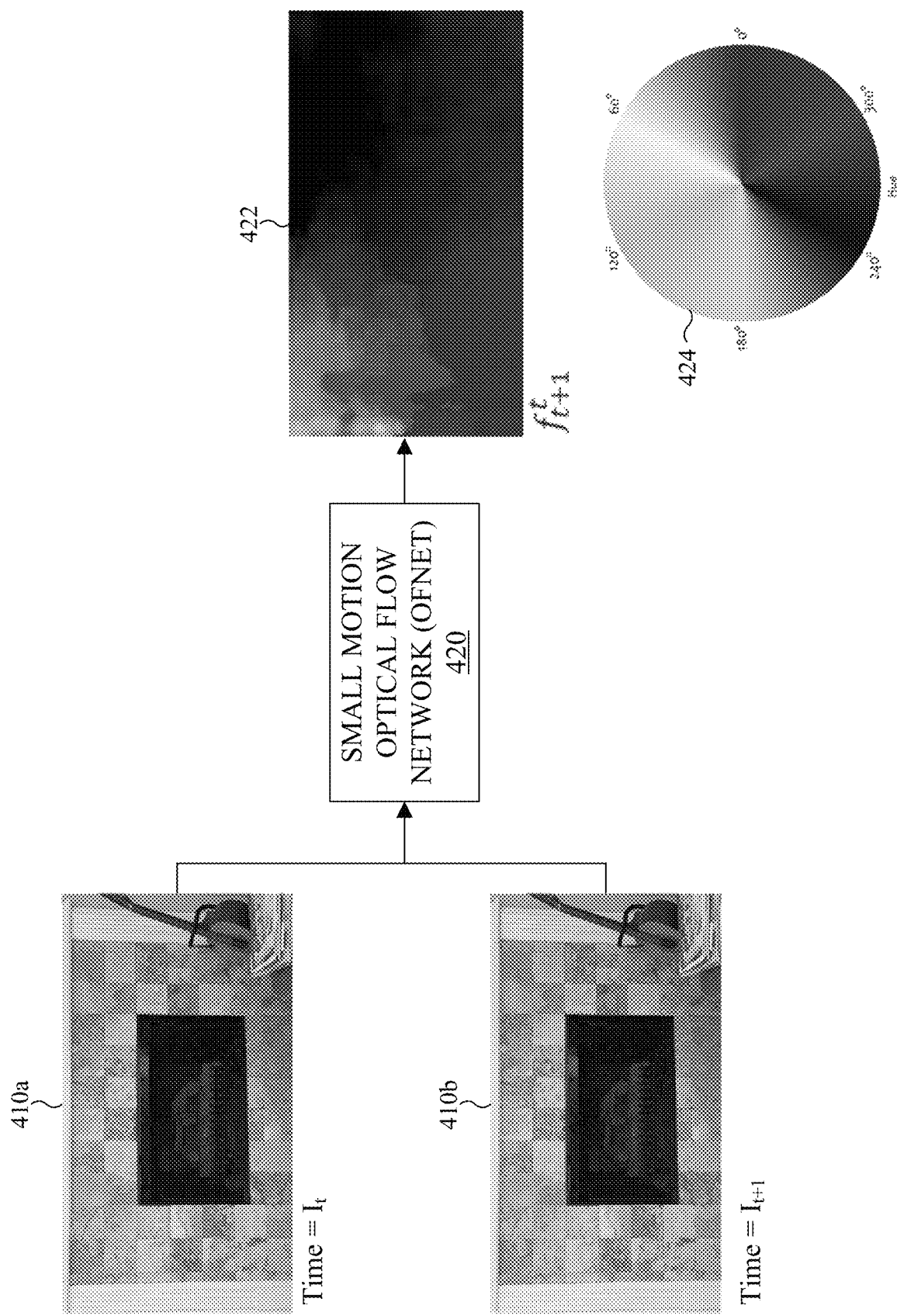
FIG. 4C illustrates an example process of using the neural network of FIG. 4B to generate a flow map in accordance with this disclosure.
Figure 4D:
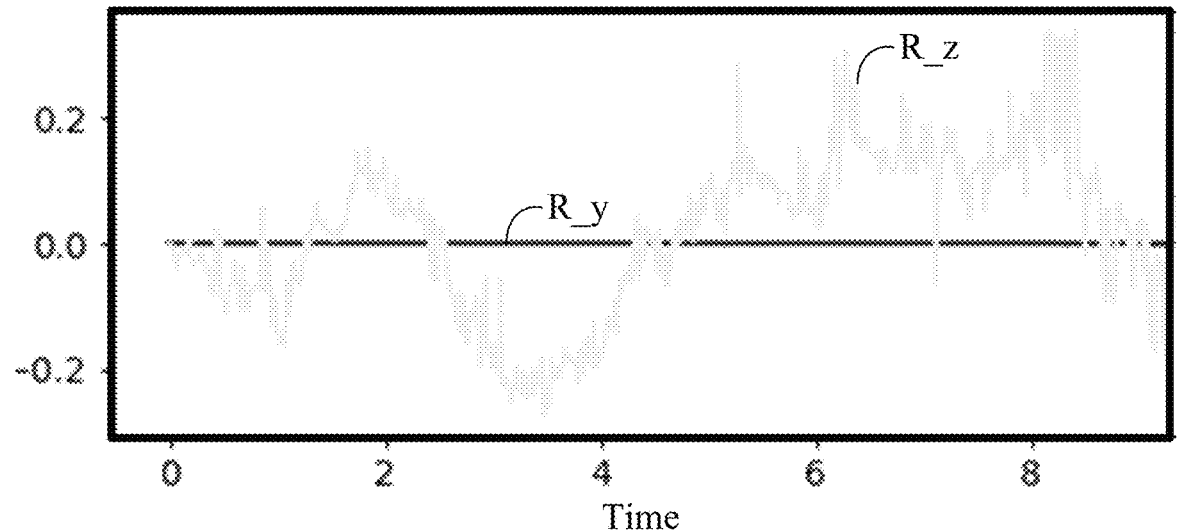
FIG. 4D illustrates an example rotation and translation map in accordance with this disclosure.
Figure 4D:
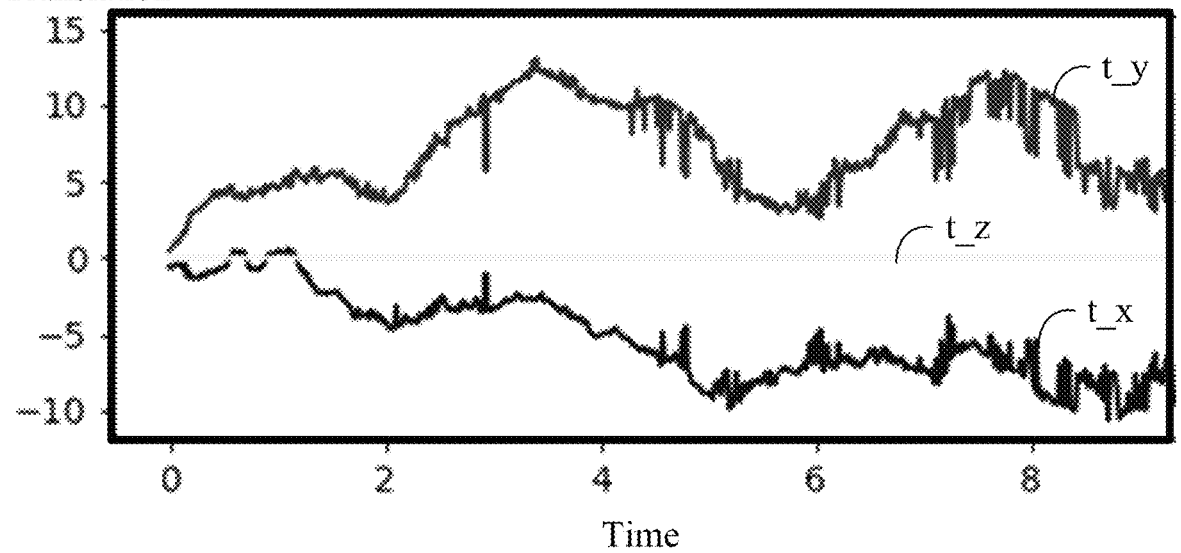

FIG. 4A illustrates an example process 400 for generating motion vectors used to generate motion-distorted image frames in accordance with this disclosure. FIG. 4B illustrates an example neural network architecture 420a used to identify motion for generating the motion vectors of FIG. 4A in accordance with this disclosure. FIG. 4C illustrates an example process of using the neural network architecture 420a of FIG. 4B to generate a flow map in accordance with this disclosure. FIG. 4D illustrates an example rotation and translation map in accordance with this disclosure. Here, the process 400 shown in FIG. 4A may be performed as part or all of the motion modeling operation 220 in the process 200 shown in FIG. 2A. For ease of explanation, FIGS. 4A through 4D are described as being associated with the electronic device 101 shown in FIG. 1. However, FIGS. 4A through 4D could be associated with any other suitable electronic device and in any suitable system, such as when used by or with the server 106.

As shown in FIG. 4A, the process 400 is generally used to capture or otherwise obtain one or more image frames 410 and to process the one or more image frames 410 in order to generate motion vectors used to modify other image frames. Depending on the implementation, the image frames 410 may be obtained in any suitable manner. For example, the image frames 410 can be captured by at least one camera or image sensor, such as the sensor 180 in FIG. 1. As another example, the image frames 410 can be obtained from an information repository, such as the memory 130 of FIG. 1. The image frames 410 represent multiple image frames that may be captured at a constant frame rate, such as 240 FPS. In some embodiments, the image frames 410 are contained in a video sequence of a predefined length, such as one to three seconds, with a frame rate of 240 FPS or higher. Additionally, the image frames 410 may be captured using an electronic device that is handheld. In some cases, the image frames 410 can capture images of a static scene, meaning objects in the static scene are fixed. Image frames 410a and 410b of FIG. 4C illustrate specific examples of two consecutive image frames of a wall.

The image frames 410 are different image frames than the image frames 202 of FIG. 2A, the image frame 300 of FIG. 3A, and the image frame 300a of FIG. 3C. As discussed above, the image frames 202 of FIG. 2A, the image frame 300 of FIG. 3A, and the image frame 300a of FIG. 3C are image frames that are captured while an electronic device is stationary, such as when a tripod or other mechanism to safeguard against motion is used. In contrast, the image frames 410 are captured when the electronic device is handheld so that handheld motion can be introduced into the image frames. Additionally, the image frames 202 of FIG. 2A, the image frame 300 of FIG. 3A, and the image frame 300a of FIG. 3C may be image frames that are captured using a longer exposure time. In contrast, the image frames 410 may be generated using a shorter exposure time, such as at 240 FPS or higher. Using a faster exposure time reduces motion blur in each individual image frame, although each subsequent frame may by slightly shifted due to hand motion. Further, the image frames 202 of FIG. 2A, the image frame 300 of FIG. 3A, and the image frame 300a of FIG. 3C may be image frames that are captured using exposure times that vary from one frame to the next. In contrast, the image frames 410 may be generated using a constant frame rate, such as at 240 FPS or higher.

The image frames 410 are provided to a small motion optical flow network (OfNet) operation 420, which generally operates to estimate small camera motion due to handshake when the image frames 410 are captured. In some embodiments, the small motion OfNet operation 420 includes a neural network. The neural network architecture 420a of FIG. 4B illustrates one specific example architecture that may be used by the small motion OfNet operation 420. Note, however, that any other trained machine learning model may be used here.

The neural network architecture 420a is trained to identify optical flow. In some embodiments, the neural network used by the small motion OfNet operation 420 identifies optical flow in the range of +/− one to twenty pixels. For example, the small motion OfNet operation 420 may identify pixel movements from one image frame to a subsequent image frame. As a particular example, FIG. 4C illustrates an example process for identifying the optical flow. The image frames 410a and 410b are examples of two consecutive image frames in the image frames 410. These image frames 410a and 410b are provided as the inputs to the small motion OfNet operation 420, and the small motion OfNet operation 420 generates an optical flow map 422. The optical flow maps 422 represents the motion between the image frames 410a and 410b on a pixel basis. Additional optical flow maps can be generated for each consecutive pair of image frames in the image frames 410. Each optical flow map 422 is a visualized flow map that can be encoded in a particular domain, such as the YUV domain. Colors or other values in the optical flow map 422 may indicate motion direction according to a key 424, and brightness in the optical flow map 422 may indicate motion strength.

The output from the small motion OfNet operation 420 is provided to a homograph matrix operation 430. The homograph matrix operation 430 identifies motion using the optical flow maps provided by the small motion OfNet operation 420. In some cases, the homograph matrix operation 430 can generate a homograph matrix representing the motion. The output from the homograph matrix operation 430 is provided to a motion vector generator operation 440, which generally decomposes the homograph matrix to generate a motion vector representing the global motion of each pixel from one frame to another frame. In some cases, handshake motion can be in the form of three-axis rotation R and three-axis translation T. Image graphs in FIG. 4D illustrate one specific example of six-axis motion. For example, for each pixel, the motion vector may represent how much a camera shifted in the X, Y, Z directions and how much the camera rotated between two of the image frames 410.

Although FIGS. 4A through 4D illustrate one example of a process for generating motion vectors and related details, various changes may be made to FIGS. 4A through 4D. For example, the electronic device 101 may perform any other desired functions as part of a larger image processing algorithm. As a particular example, image frames may undergo other suitable pre-processing and post-processing operations.

As discussed above, the noise modeling operation 230 of FIG. 2A generates a noisy motion-distorted image frame 232 by adding noise to a motion-distorted image frame 222. The noise modeling operation 230 adds synthetic noise to the motion-distorted image frame 222 in order to emulate captured noise. In some cases, the amount of noise can be based on an exposure setting associated with an image frame, such as an ISO value and noise parameters that are calibrated to a specific sensor. The ISO value for an image frame, such as one of the multiple image frames 202, can be transmitted from the motion modeling operation 220 to the noise modeling operation 230. In some cases, the noise parameters include read noise, photon noise, and spatial correlations.

Figure 5A:
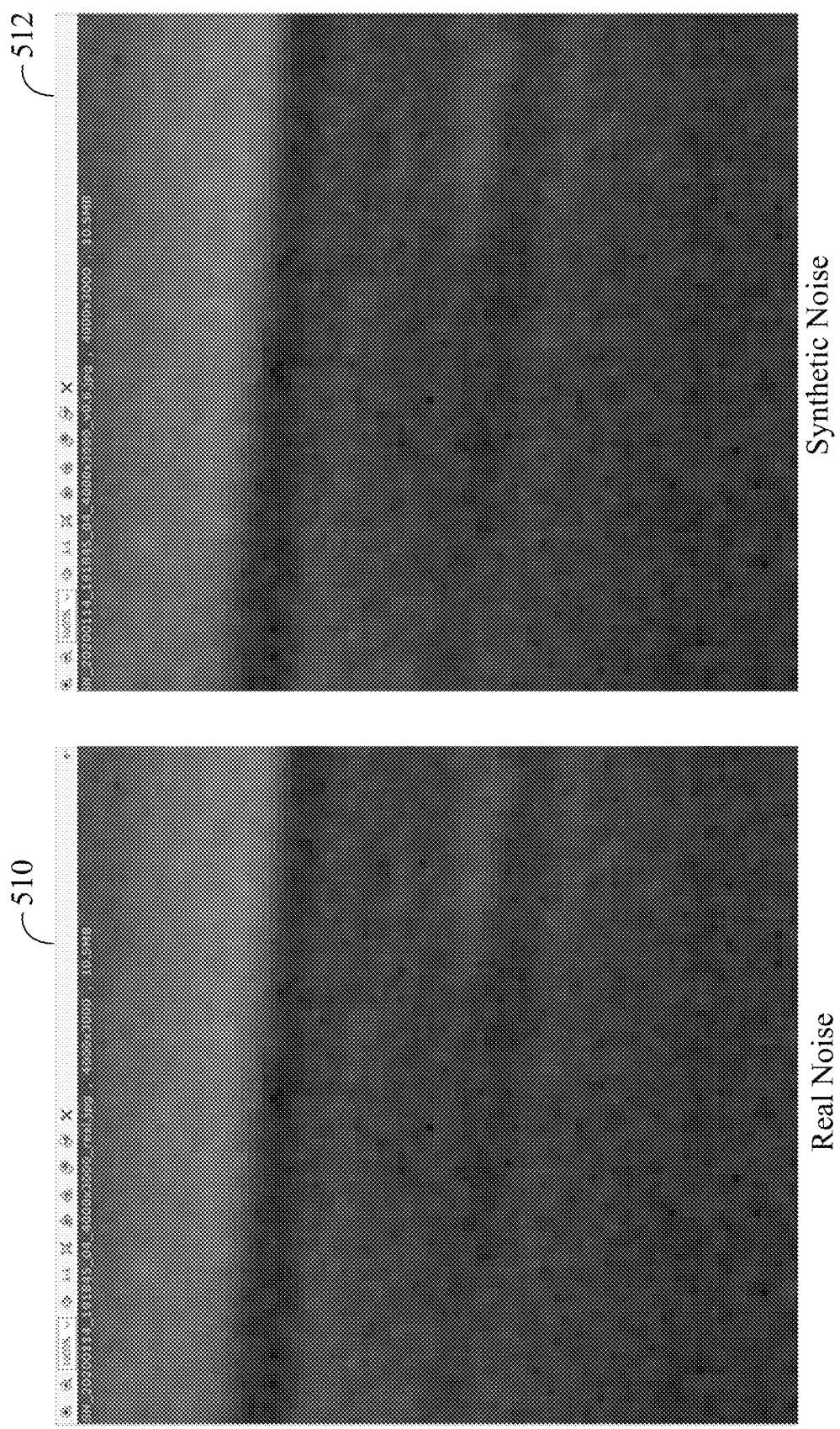
FIG. 5A illustrates example images of real and synthetic noise in accordance with this disclosure.

Since the multiple image frames 202 are captured using a tripod or other mechanism to safeguard against motion, these image frames 202 can have a longer exposure time, which reduces noise in the image frames. As such, the noise modeling operation 230 adds noise to the image frames 202 for a given ISO value to represent image frames captured with a shorter exposure time. An example of actual noise and noise that is generated by the noise modeling operation 230 are shown in FIG. 5A. FIG. 5A illustrates example image frames 510 and 512 of real and synthetic noise in accordance with this disclosure. More specifically, the image frame 510 illustrates noise using a particular image sensor of a camera, and the image frame 512 illustrates added synthetic noise that is calibrated based on the sensor which captured the image frame 512.

Figure 5B:
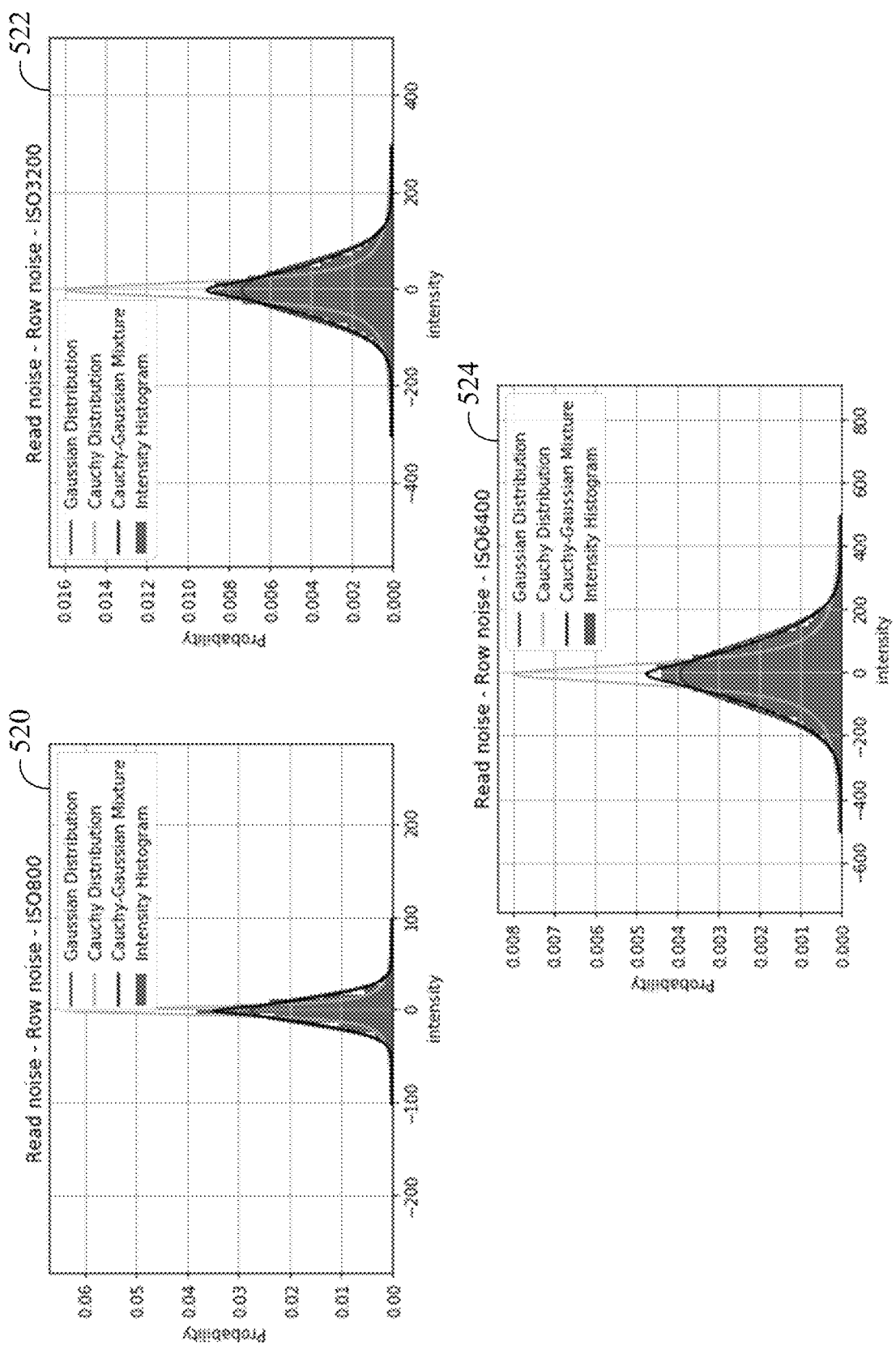
FIG. 5B illustrates examples of calibrating read noise in accordance with this disclosure.

Since noise parameters can change for each image sensor, the noise modeling operation 230 may calibrate the noise parameters for a specific sensor. In some embodiments, the parameters can be calibrated prior to the noise modeling operation 230 applying noise to a motion-distorted image frame 222. For example, to calibrate the read noise, the noise modeling operation 230 may block a camera lens and capture dark raw images with various ISO levels. The noise modeling operation 230 can create a histogram of the raw image pixels for each specific ISO level, perform a curve-fitting operation on the generated histograms, and calibrate Gaussian and Cauchy parameters. The noise modeling operation 230 can repeat this process for the multiple ISO levels and red, green_1, green_2, blue (R, G1, G2, B) levels. Any ISO values that are in between the captured values can be interpolated. Graphs 520, 522, and 524 of FIG. 5B illustrate one specific example of read noise based on different ISO values. For example, the graph 520 is the read noise for an ISO value of 800, the graph 522 is the read noise for an ISO value of 3200, and the graph 524 is the read noise for an ISO value of 6400.

Figure 5C:
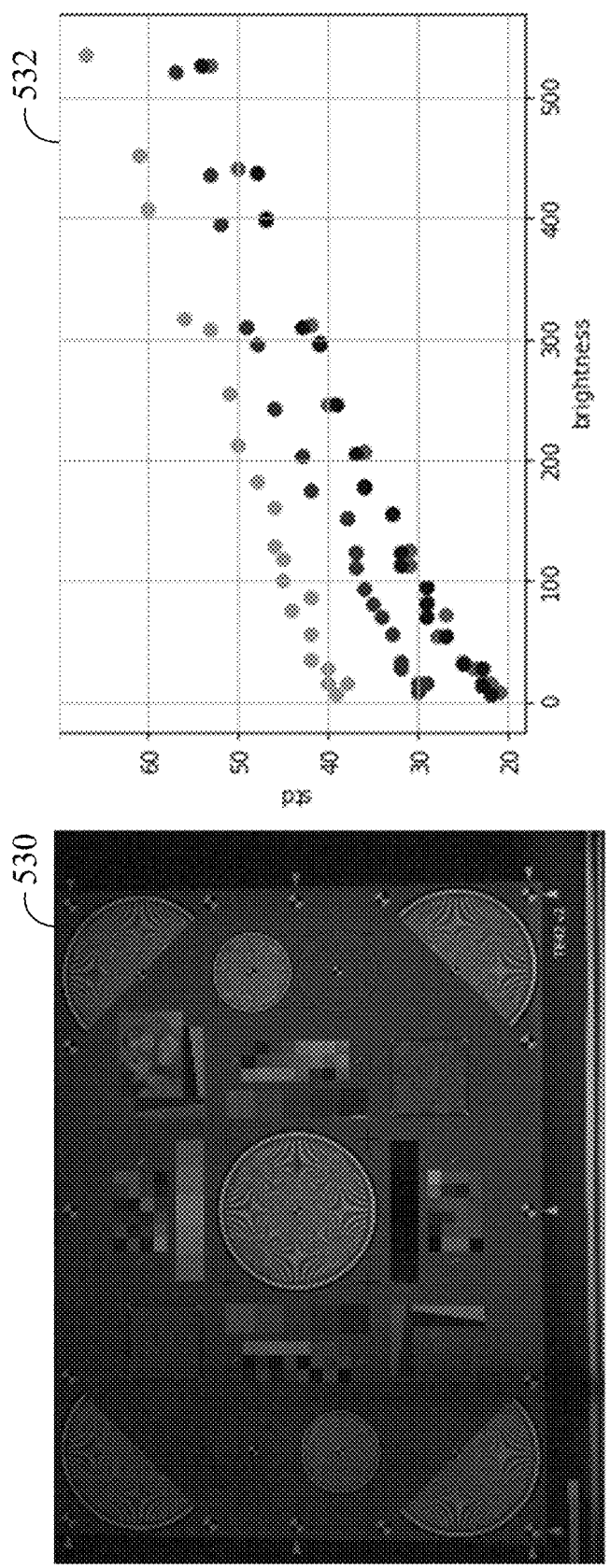
FIG. 5C illustrates examples of calibrating photon noise in accordance with this disclosure.

To calibrate the photon noise, the noise modeling operation 230 may capture a brightness chart in a low-light setting. An image frame 530 of FIG. 5C illustrates one specific example of a brightness chart. As illustrated in FIG. 5C, the image frame 530 includes multiple square patches with gradually increasing brightness. The noise modeling operation 230 can identify and save the intensity value of each square, such as in a memory like the memory 130 of FIG. 1. The noise modeling operation 230 can identify a standard deviation for each point and generate a graph plotting the intensity value of each square to the corresponding standard deviation value. A graph 532 of FIG. 5C illustrates one specific example of such a graph. As illustrated in FIG. 5C, the x-axis of the graph 532 is the intensity value of each square, and the y-axis of the graph 532 is the corresponding standard deviation. The noise modeling operation 230 can create a point plot to observe the non-linearity and synthetically generate a noise image frame and plot the curve again. The noise modeling operation 230 can compare the curve corresponding to the synthetically-generated noise image frame and the real curve to find an optimal value.

To calibrate the spatial correlation, the noise modeling operation 230 can obtain an image frame, such as one of the multiple image frames 202 of FIG. 2A or another image frame. The noise modeling operation 230 can perform in-plane correlation and channel correlation. To perform the in-plane correlation, for each color plane, the noise modeling operation 230 can select a number of adjacent pixels and derive a correlation coefficient. The adjacent pixels may represent a square, such as a five-pixel by five-pixel square, although other collections of adjacent pixels may be used. In some cases, the correlation coefficient can be defined as follows:

$$\mathrm{corr}(x,y) = \Sigma(xi-\bar{x})(yi-\bar{y})/N \qquad (6)$$

To perform the channel correlation, for each pixel, the noise modeling operation 230 can select adjacent R, G1, G2, and B pixels and identify a correlation coefficient. The in-plane and channel correlations can be saved, such as in matrices, and the noise modeling operation 230 can apply the matrices on top of the synthetic noise image frames as described in Equation (1) above.

Figure 6A:
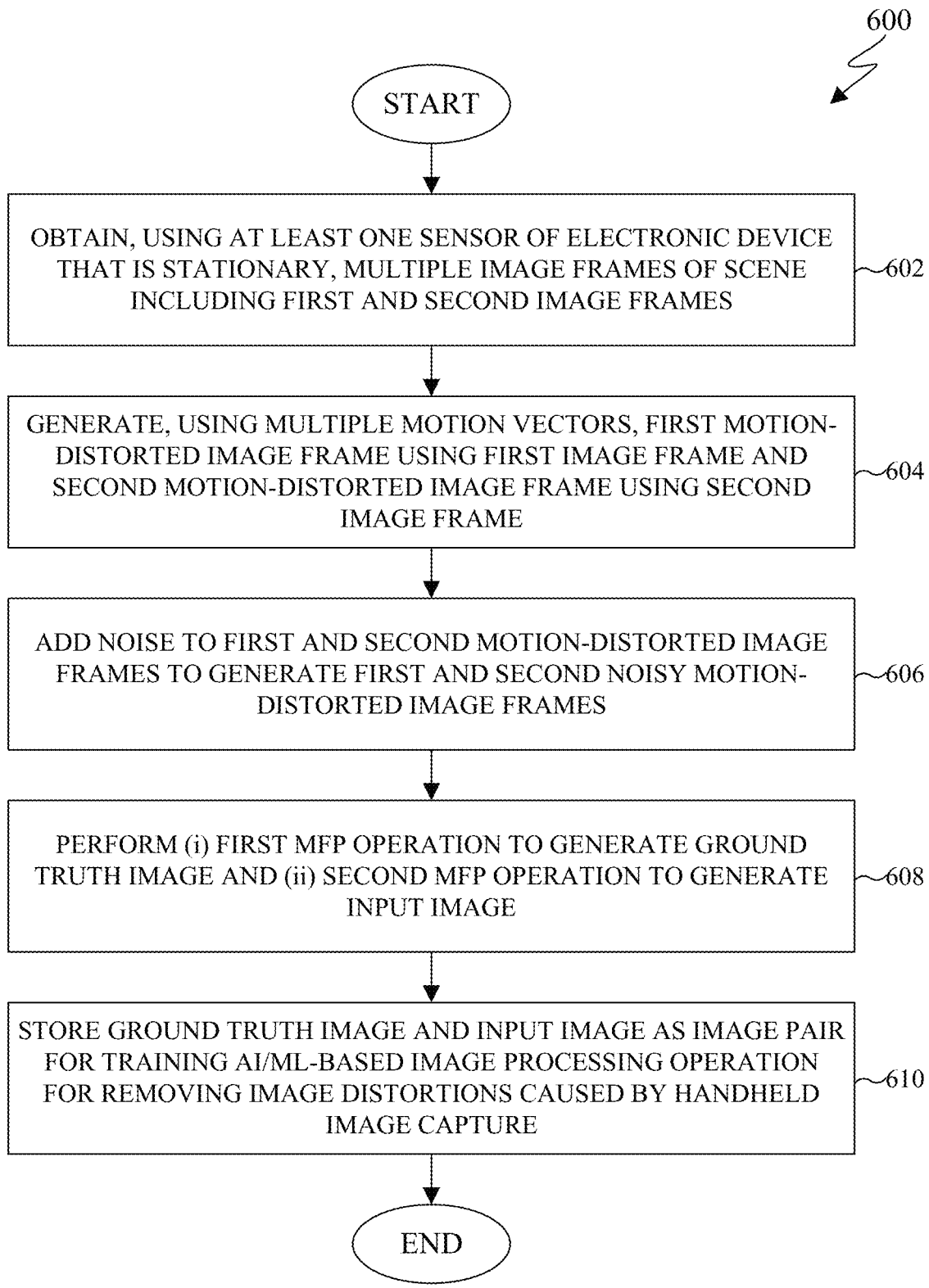
FIG. 6A illustrates an example method for generating training data in accordance with this disclosure.
Figure 6B:
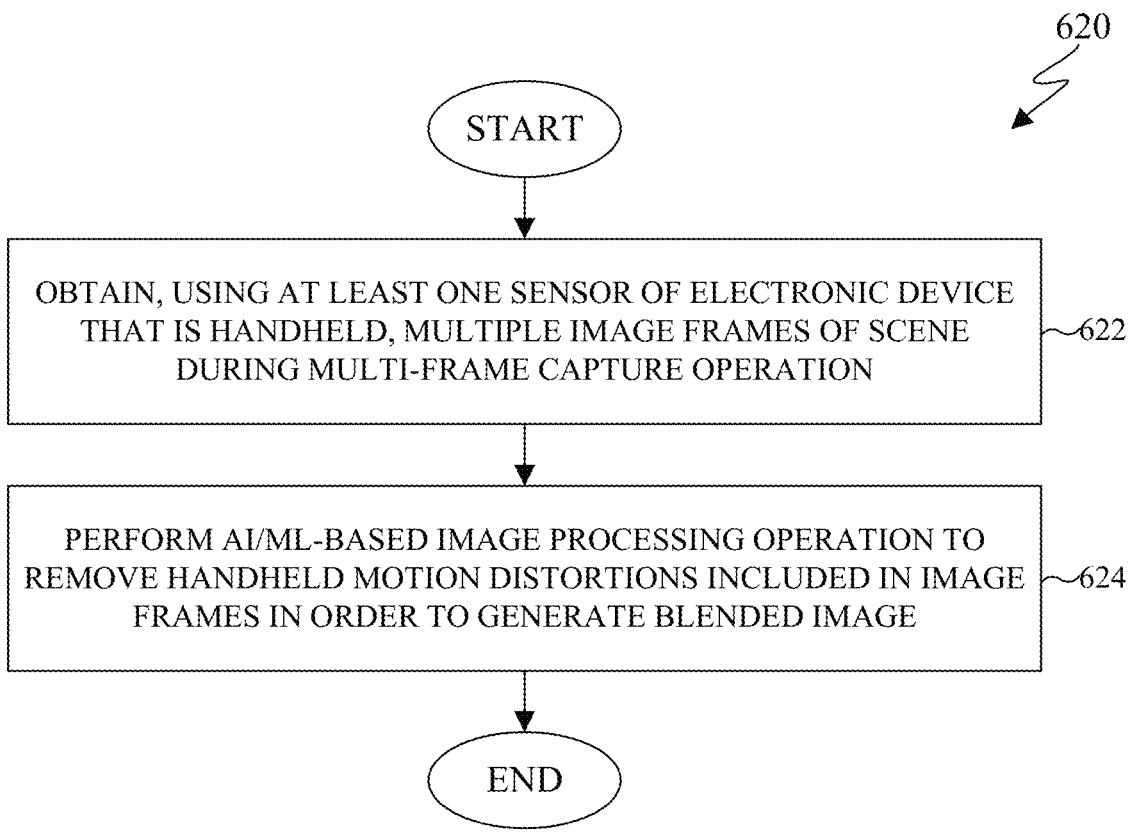
FIG. 6B illustrates an example method for image processing in accordance with this disclosure.

FIG. 6A illustrates an example method 600 for generating training data in accordance with this disclosure. FIG. 6B illustrates an example method 620 for image processing in accordance with this disclosure. For ease of explanation, the methods 600 and 620 shown in FIGS. 6A and 6B are described as being performed using the electronic device 101 shown in FIG. 1. However, the methods 600 and 620 shown in FIGS. 6A and 6B could be used with any other suitable electronic device and in any suitable system, such as when performed by the server 106.

As shown in FIG. 6A, the electronic device 101 obtains multiple image frames of a scene using at least one sensor of the electronic device 101 while the electronic device 101 is stationary in step 602. The multiple image frames include at least a first image frame and a second image frame. The first and second image frames can be captured using a multi-frame capture operation and may or may not be captured using different exposure settings. Different exposure settings can include different exposure times, different ISO values, or both. In some embodiments, the first and second image frames are captured using different exposure times but using the same ISO value.

The electronic device 101 generates a first motion-distorted image frame using the first image frame and a second motion-distorted image frame using the second image frame in step 604. To generate the first and second motion-distorted image frames, the electronic device 101 uses multiple motion vectors that can be previously generated from a different set of image frames. The number of motion vectors that are used to generate the first motion-distorted image frame may be based on an exposure time of the first image frame. Similarly, the number of motion vectors that are used to generate the second motion-distorted image frame may be based on an exposure time of the second image frame.

The electronic device 101 adds noise to the first and second motion-distorted image frames to generate first and second noisy motion-distorted image frames in step 606. The amount of noise that is added to the first motion-distorted image frame may be based on one or more calibrated noise parameters associated with a particular sensor and an ISO value of the first image frame. Similarly, the amount of noise that is added to the second motion-distorted image frame may be based on one or more calibrated noise parameters associated with a particular sensor and an ISO value of the second image frame.

The electronic device 101 performs two different MFP operations in step 608. The first MFP operation blends the first and second motion-distorted image frames together to generate a single ground truth image. The second MFP operation blends the first and second noisy motion-distorted image frames together to generate a single input truth image. In some embodiments, when more than two image frames are obtained in step 602, a motion-distorted image frame and a noisy motion-distorted image frame may be generated for each additional obtained image frame. The additional motion-distorted image frames may also be blended with the first and second motion-distorted image frames to generate the single ground truth image. Similarly, the additional noisy motion-distorted image frames may also be blended with the first and second noisy motion-distorted image frames to generate the single input truth image.

In step 610, the electronic device 101 stores the ground truth image and the input image as an image pair for training the AI/ML-based image processing operation. Note that steps 602-610 may be repeated any number of times here to produce a desired amount of training data for training the AI/ML-based image processing operation.

As shown in FIG. 6B, the electronic device 101 obtains multiple image frames of a scene using at least one sensor of the electronic device 101 while the electronic device 101 is handheld in step 622. The multiple image frames include at least a first image frame and a second image frame. The first and second image frames can be captured using a multi-frame capture operation and may or may not include different exposure times or other exposure settings. The electronic device 101 performs an AI/ML image processing operation to generate a blended image in step 624. The AI/ML image processing operation removes image blur caused by handshaking motion while the multiple image frames were captured. The AI/ML image processing operation can be trained using ground truth images and input images generated as described above with respect to the method 600. In some embodiments, the AI/ML image processing operation aligns the multiple image frames and blends the aligned multiple image frames to generate the blended image while removing motion blur.

Although FIG. 6A illustrates one example of a method 600 for generating training data and FIG. 6B illustrates one example of a method 620 for image processing, various changes may be made to FIGS. 6A and 6B. For example, while shown as a series of steps, various steps in each of FIGS. 6A and 6B may overlap, occur in parallel, occur in a different order, or occur any number of times. As another example, steps may be omitted or replaced by other steps.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for synthetic image training data generation, the method comprising:

obtaining, using at least one sensor of an electronic device that is stationary, multiple image frames of a scene including a first image frame and a second image frame;

generating, using multiple motion vectors that were previously generated, a first motion-distorted image frame using the first image frame and a second motion-distorted image frame using the second image frame;

adding noise to the first and second motion-distorted image frames to generate first and second noisy motion-distorted image frames;

performing (i) a first multi-frame processing (MFP) operation to generate a ground truth image using the first and second motion-distorted image frames and (ii) a second MFP operation to generate an input image using the first and second noisy motion-distorted image frames; and storing the ground truth image and the input image as an image pair for training an artificial intelligence/machine learning (AI/ML)-based image processing operation for removing image distortions caused by handheld image capture.

2. The method of claim 1, wherein:

the first image frame is captured using a first exposure setting;

the second image frame is captured using a second exposure setting that is different than the first exposure setting;

one or more of the motion vectors used to generate the first motion-distorted image frame are based on the first exposure setting;

one or more of the motion vectors used to generate the second motion-distorted image frame are based on the second exposure setting;

the noise added to generate the first noisy motion-distorted image frame is based on the first exposure setting; and the noise added to generate the second noisy motion-distorted image frame is based on the second exposure setting.

3. The method of claim 2, wherein the first and second exposure settings include at least one of different exposure times or different ISO values.

4. The method of claim 1, further comprising generating the motion vectors by:
obtaining additional image frames captured at a frame rate that is larger than a threshold; and
identifying global motion between two image frames of the additional image frames using a neural network, the global motion representing a motion vector including rotation motion and translation motion.

5. The method of claim 4, wherein generating the first motion-distorted image frame comprises:
identifying an exposure time of the first image frame;
identifying an exposure time of each of the additional image frames; and
determining two or more of the motion vectors to be used to distort the first image frame based on the exposure time of the first image frame and the exposure time of each of the additional image frames.

6. The method of claim 5, further comprising:
selecting the two or more of the motion vectors starting from an initial motion vector that is randomly selected;
generating multiple warped image frames, each warped image frame representing the first image frame that is distorted using one of the selected motion vectors; and
combining the warped image frames to generate the first motion-distorted image frame.

7. The method of claim 1, further comprising:
calibrating multiple parameters associated with a sensor of another electronic device, the parameters including read noise, photon noise, and spatial correlation;
determining an amount of noise to be added to the first motion-distorted image frame based on an ISO value of the first image frame and the parameters; and
determining an amount of noise to be added to the second motion-distorted image frame based on an ISO value of the second image frame and the parameters.

8. The method of claim 1, wherein:
the electronic device is a first electronic device; and
the method further comprises:
obtaining additional image frames based on a multi-frame capture operation using the at least one sensor while the first electronic device is stationary;
generating additional image pairs using the additional image frames;
storing the additional image pairs; and
training the AI/ML-based image processing operation using the image pair and the additional image pairs in order to generate an image with reduced motion distortions from image frames captured by a second electronic device that is handheld.

9. An electronic device comprising:
at least one sensor; and
at least one processing device configured to:
obtain, using the at least one sensor while the electronic device is stationary, multiple image frames of a scene including a first image frame and a second image frame;
generate, using multiple motion vectors that were previously generated, a first motion-distorted image frame using the first image frame and a second motion-distorted image frame using the second image frame;
add noise to the first and second motion-distorted image frames to generate first and second noisy motion-distorted image frames;
perform (i) a first multi-frame processing (MFP) operation to generate a ground truth image using the first and second motion-distorted image frames and (ii) a second MFP operation to generate an input image using the first and second noisy motion-distorted image frames; and
store the ground truth image and the input image as an image pair for training an artificial intelligence/machine learning (AI/ML)-based image processing operation for removing image distortions caused by handheld image capture.

10. The electronic device of claim 9, wherein:
the at least one sensor is configured to capture the first image frame using a first exposure setting;
the at least one sensor is configured to capture the second image frame using a second exposure setting that is different than the first exposure setting;
the at least one processing device is configured to select one or more of the motion vectors to generate the first motion-distorted image frame based on the first exposure setting;
the at least one processing device is configured to select one or more of the motion vectors to generate the second motion-distorted image frame based on the second exposure setting;
the at least one processing device is configured to add the noise to generate the first noisy motion-distorted image frame based on the first exposure setting; and
the at least one processing device is configured to add the noise to generate the second noisy motion-distorted image frame based on the second exposure setting.

11. The electronic device of claim 10, wherein the first and second exposure settings include at least one of different exposure times or different ISO values.

12. The electronic device of claim 9, wherein:
the at least one processing device is further configured to generate the motion vectors; and
to generate the motion vectors, the at least one processing device is further configured to:
obtain additional image frames captured at a frame rate that is larger than a threshold; and
identify global motion between two image frames of the additional image frames using a neural network, the global motion representing a motion vector including rotation motion and translation motion.

13. The electronic device of claim 12, wherein, to generate the first motion-distorted image frame, the at least one processing device is configured to:
identify an exposure time of the first image frame;
identify an exposure time of each of the additional image frames; and
determine two or more of the motion vectors to be used to distort the first image frame based on the exposure time of the first image frame and the exposure time of each of the additional image frames.

14. The electronic device of claim 13, wherein, to generate the first motion-distorted image frame, the at least one processing device is further configured to:
select the two or more of the motion vectors starting from an initial motion vector that is randomly selected;
generate multiple warped image frames, each warped image frame representing the first image frame that is distorted using one of the selected motion vectors; and
combine the warped image frames to generate the first motion-distorted image frame.

15. The electronic device of claim 9, wherein the at least one processing device is further configured to:

calibrate multiple parameters associated with a sensor of another electronic device, the parameters including read noise, photon noise, and spatial correlation;

determine an amount of noise to be added to the first motion-distorted image frame based on an ISO value of the first image frame and the parameters; and determine an amount of noise to be added to the second motion-distorted image frame based on an ISO value of the second image frame and the parameters.

16. The electronic device of claim 9, wherein the at least one processing device is further configured to:

obtain additional image frames based on a multi-frame capture operation using the at least one sensor while the electronic device is stationary;

generate additional image pairs using the additional image frames;

store the additional image pairs; and train the AI/ML-based image processing operation using the image pair and the additional image pairs in order to generate an image with reduced motion distortions from image frames captured by another electronic device that is handheld.

17. A method for image processing, the method comprising:

obtaining, using at least one sensor of an electronic device that is handheld, multiple image frames of a scene using multiple exposure times during a multi-frame capture operation; and performing an artificial intelligence/machine learning (AI/ML)-based image processing operation to remove one or more handheld motion distortions included in the multiple image frames in order to generate a blended image;

wherein the AI/ML-based image processing operation is trained using multiple image pairs, each of the image pairs including (i) a ground truth image with motion distortion and (ii) an input image corresponding to a noisy version of the ground truth image.

18. The method of claim 17, wherein performing the AI/ML-based image processing operation comprises:

aligning the multiple image frames; and blending the aligned multiple image frames to generate the blended image.

19. The method of claim 17, wherein:

the ground truth image is generated based on (i) multiple motion vectors applied to first and second image frames to generate first and second motion-distorted image frames and (ii) a first multi-frame processing (MFP) operation performed on the first and second motion-distorted image frames to generate the ground truth image, wherein the first and second image frames were obtained using at least one sensor of another electronic device that was stationary; and the input image is generated based on (i) noise added to the first and second motion-distorted image frames to generate first and second noisy motion-distorted image frames and (ii) a second MFP operation performed on the first and second noisy motion-distorted image frames to generate the input image.

20. An electronic device comprising:

at least one sensor; and at least one processing device configured to:

obtain, using the at least one sensor while the electronic device is handheld, multiple image frames of a scene using multiple exposure times during a multi-frame capture operation; and perform an artificial intelligence/machine learning (AI/ML)-based image processing operation to remove one or more handheld motion distortions included in the multiple image frames in order to generate a blended image;

wherein the AI/ML-based image processing operation is trained using multiple image pairs, each of the image pairs including (i) a ground truth image with motion distortion and (ii) an input image corresponding to a noisy version of the ground truth image.

21. The electronic device of claim 20, wherein, to perform the AI/ML-based image processing operation, the at least one processing device is configured to:

align the multiple image frames; and blend the aligned multiple image frames to generate the blended image.

22. The electronic device of claim 20, wherein:

the ground truth image is generated based on (i) multiple motion vectors applied to first and second image frames to generate first and second motion-distorted image frames and (ii) a first multi-frame processing (MFP) operation performed on the first and second motion-distorted image frames to generate the ground truth image, wherein the first and second image frames were obtained using at least one sensor of another electronic device that was stationary; and the input image is generated based on (i) noise added to the first and second motion-distorted image frames to generate first and second noisy motion-distorted image frames and (ii) a second MFP operation performed on the first and second noisy motion-distorted image frames to generate the input image.

* * * * *